United States Patent
Xu et al.

(10) Patent No.: US 10,117,136 B2
(45) Date of Patent: Oct. 30, 2018

(54) METHODS, APPARATUSES AND COMPUTER PROGRAM PRODUCTS FOR REDUCING MEDIA GAP WHEN CONNECTING INDEPENDENT BEARER PATHS

(71) Applicant: TELEFONAKTIEBOLAGET LM ERICSSON (PUBL), Stockholm (SE)

(72) Inventors: Zhigang Xu, Plano, TX (US); Pui Ho, Euless, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/550,760

(22) PCT Filed: Feb. 13, 2015

(86) PCT No.: PCT/IB2015/051090
§ 371 (c)(1),
(2) Date: Aug. 11, 2017

(87) PCT Pub. No.: WO2016/128798
PCT Pub. Date: Aug. 18, 2016

(65) Prior Publication Data
US 2018/0049071 A1    Feb. 15, 2018

(51) Int. Cl.
*H04W 36/00* (2009.01)
*H04L 29/06* (2006.01)
*H04W 80/10* (2009.01)

(52) U.S. Cl.
CPC ..... *H04W 36/0022* (2013.01); *H04L 65/1046* (2013.01); *H04L 65/1069* (2013.01); *H04L 65/1016* (2013.01); *H04W 80/10* (2013.01)

(58) Field of Classification Search
CPC ............. H04W 36/0022; H04W 80/10; H04L 65/1016; H04L 65/1069
See application file for complete search history.

(56) References Cited

U.S. PATENT DOCUMENTS

2002/0103919 A1* 8/2002 Hannaway ....... H04N 21/23406
709/231
2004/0218527 A1* 11/2004 Schwartz ........... H04N 21/2381
370/230
(Continued)

FOREIGN PATENT DOCUMENTS

EP     2343922 A1    7/2011
EP     2244504 B1    10/2012

OTHER PUBLICATIONS

PCT,IB2015/051090, Written Opinion of the International Searching Authority.*
(Continued)

*Primary Examiner* — Jenee Holland

(57) ABSTRACT

In some embodiments, a method receives a trigger to set up a bearer path connecting a first party (A) and a second party (B) via a media connection function. The method determines a predicted time gap between when the media connection function is expected to receive a bearer packet from the first party (A) and when the media connection function is expected to receive a bearer packet from the second party (B). The method uses the predicted time gap to delay connection setup toward whichever of the first party (A) or the second party (B) is expected to receive the bearer packet first.

21 Claims, 14 Drawing Sheets

(56) References Cited

U.S. PATENT DOCUMENTS

| | | | |
|---|---|---|---|
| 2007/0091848 A1* | 4/2007 | Karia | H04L 29/06027 370/331 |
| 2009/0016233 A1* | 1/2009 | Lu | H04L 43/0829 370/252 |
| 2009/0175241 A1* | 7/2009 | Ohta | H04W 36/02 370/331 |
| 2009/0238211 A1* | 9/2009 | DeCusatis | H04L 47/10 370/498 |
| 2010/0002591 A1* | 1/2010 | Mizutani | H04L 43/0852 370/241.1 |
| 2010/0002632 A1* | 1/2010 | Park | H04L 47/10 370/328 |
| 2010/0002651 A1* | 1/2010 | Hofmann | H04W 36/02 370/331 |
| 2010/0271977 A1* | 10/2010 | Sohn | H04W 76/25 370/254 |
| 2010/0309803 A1* | 12/2010 | Toh | H04L 1/0006 370/252 |
| 2010/0331055 A1 | 12/2010 | Lothrop et al. | |
| 2011/0019580 A1* | 1/2011 | Nagasawa | H04W 36/02 370/252 |
| 2012/0276946 A1* | 11/2012 | Sung | H04W 24/00 455/525 |
| 2013/0195076 A1* | 8/2013 | Keller | H04W 36/0022 370/331 |
| 2014/0226658 A1* | 8/2014 | Kakadia | H04L 43/0882 370/389 |
| 2014/0269611 A1* | 9/2014 | Ionescu | H04W 36/0022 370/331 |
| 2016/0366631 A1* | 12/2016 | Crisci | H04W 4/02 |

OTHER PUBLICATIONS

3GPP TS 23.216 V12.2.0 3rd Generation Partnership Project; Technical Specification Group Services and System Aspects; Single Radio Voice Call Continuity (SRVCC); Stage 2 (Release 12), Dec. 2014.

3GPP TS 23.237 V12.2.0 3rd Generation Partnership Project; Technical Specification Group Services and System Aspects; IP Multimedia Subsystem (IMS) Service Continuity; Stage 2 (Release 12), Mar. 2013.

3GPP TS 23.216 V11.8.0 3rd Generation Partnership Project; Technical Specification Group Services and System Aspects; Single Radio Voice Call Continuity (SRVCC); Stage 2 (Release 11), Mar. 2013.

* cited by examiner

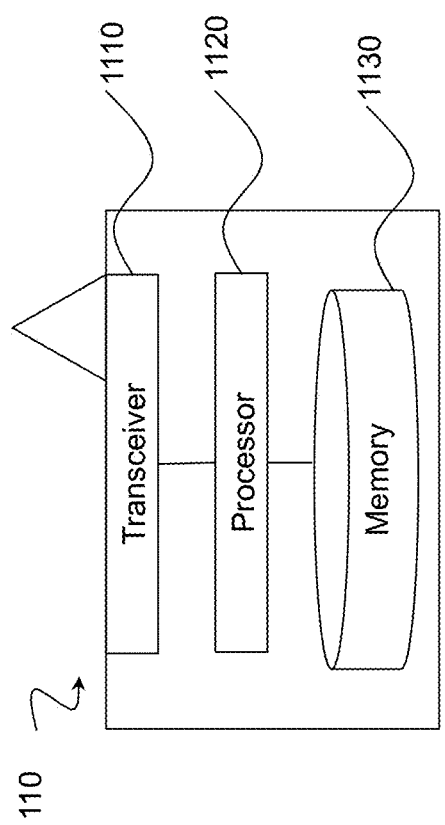

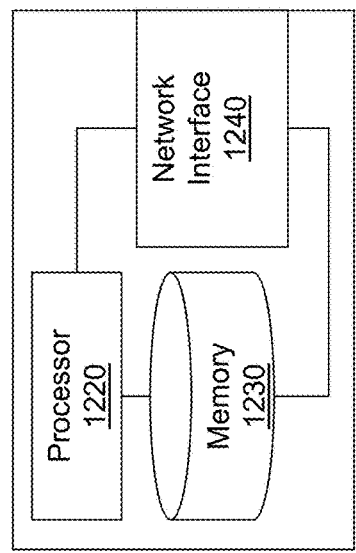
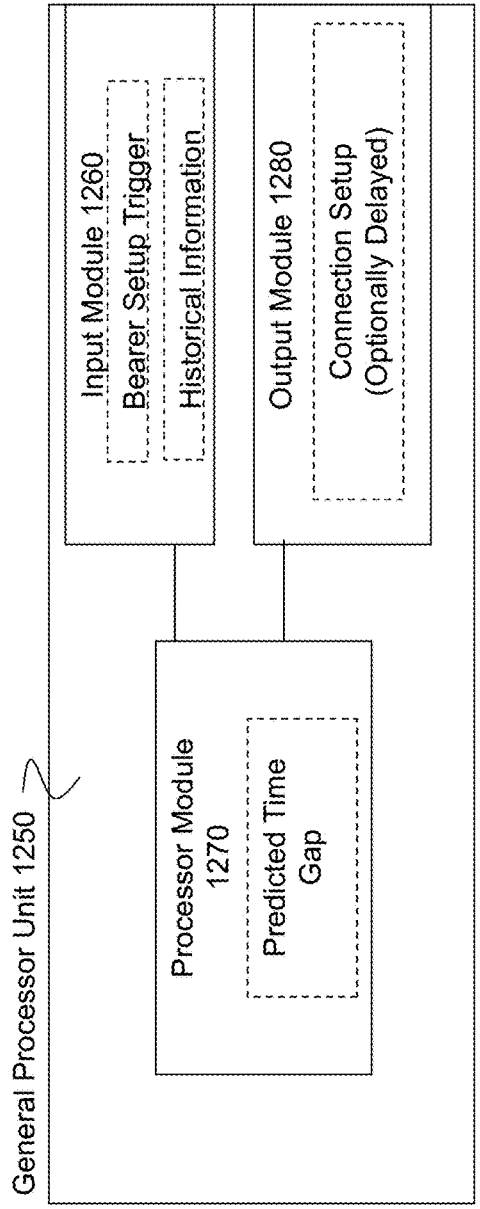
Fig. 12A
Fig. 12B

METHODS, APPARATUSES AND COMPUTER PROGRAM PRODUCTS FOR REDUCING MEDIA GAP WHEN CONNECTING INDEPENDENT BEARER PATHS

This application is a 371 of International Application No. PCT/IB2015/051090, filed Feb. 13, 2015, the disclosure of which is fully incorporated herein by reference.

TECHNICAL FIELD

Certain embodiments relate, in general, to wireless communications and, more particularly, to reducing media gap when connecting independent bearer paths.

BACKGROUND

FIG. 1 is a diagram illustrating a wireless communications network 1000 that includes one or more wireless devices 110, such as a user equipment (UE), one or more radio access nodes 120, such as an eNodeB (eNB), and various network nodes 130. Examples of network nodes 130 may include a mobility management entity (MME), a switch or server (e.g., a mobile switching center (MSC)), a media gateway (MGW), a serving GPRS support node (SGSN), a serving gateway/packet data network gateway (S-GW/PDN GW), an IP multimedia system (IMS), a base station controller (BSC), a radio network controller (RNC), and/or other suitable nodes. Wireless device 110 communicates with radio access node 120 over a wireless interface. For example, wireless communication device transmits wireless signals to radio access node 120 and/or receives wireless signals from radio access node 120. The wireless signals contain voice traffic, data traffic, and control signals, for example. One or more network nodes 130 manage the establishment of communication sessions and various other functionalities for wireless device 110. The radio access node 120 and the network nodes 130 connect through interconnecting network 125, which refers to any interconnecting system capable of transmitting audio, video, signals, data, messages, or any combination of the preceding.

In certain situations, wireless device 110 may move from packet switched (PS) access, such as Evolved-Universal Terrestrial Radio Access Network (E-UTRAN), to circuit switched (CS) access, such as UTRAN or GSM EDGE Radio Access Network (GERAN). To continue the voice call/session when moving from PS access to CS access, single radio voice call continuity (SRVCC) technology can be used. FIGS. 2A-2B illustrate an example of a SRVCC message flow described in the 3GPP TS 23.216 specification. In particular, the figures illustrate the message flow for a wireless device 110 (UE) moving from E-UTRAN to GERAN. For a detailed description of each step in this figure, please refer to 3GPP TS 23.216.

From the perspective of the MSC server, the first message for SRVCC is the PS to CS request (step 5 in FIG. 2A). The PS to CS request includes a session transfer number for SRVCC (STN-SR) and an identification of the target, such as a target RNC ID or a target Cell ID. The STN-SR identifies an IMS node, such as an Access Transfer Control Function (ATCF) or a Service Centralization and Continuity Application Server (SCC-AS) that performs the bearer path update during SRVCC. Based on the data from the PS to CS Request, the MSC sets the bearer path to the target RNC/BSS. After the bearer path to target RNC/BSS is set up, the MSC initiates the session transfer (step 10 in FIG. 2A) and sends a PS to CS Response to the MME (step 13 in FIG. 2A).

As mentioned by 3GPP TS 23.216, in FIG. 2A, steps 11 and 12 are independent of step 13. This means that the time for the UE to tune to circuit switched access (Tcs) is most likely different than the time for the IMS side to finish the session transfer of the voice path (Tps) whereby the IMS connects the remote end with the bearer path towards the MSC server. A voice gap/interruption occurs when Tps and Tcs are different. The duration of the voice gap/interruption can be determined by calculating the difference between the two times (Tps−Tcs). In general, as the duration of the voice gap/interruption increases, the end user experience gets worse.

Several ideas have been considered to reduce this voice gap. As an example, Release 10 SRVCC specifications introduce the ATCF, which assumes that Tps is normally greater than Tcs if the session transfer is performed in the home network which may be different from the visiting network to which the MSC server belongs. The ATCF anchors the bearer for the IMS and is normally put in the visiting network. During SRVCC, the ATCF performs session transfer. Because the ATCF and the MSC server are both in the visiting network, the Tps may be reduced and hence the voice gap is reduced.

As another example, in European Patent Application EP 2343922 A1 entitled "Enhancement of single radio voice call continuity mobility," the MSC server waits to send the handover command (PS to CS Response) until after it has received a report indicating that the media gateway under its control has received the first packet from the interworking agent.

As another example, in European Patent Specification EP 2244504 B1, entitled "Reduction of flow break in sr-vcc mobility," the MSC server sets a delay timer value in the handover command (PS to CS response). When the UE receives the handover command with this timer, it delays the access transfer for the duration specified by the timer.

Returning to FIG. 2A, at step 14 the source MME sends a Handover command to the Source E-UTRAN, at step 15 the source E-UTRAN sends a HO from E-UTRAN command to the UE, and at step 16 the UE tunes to the GERAN. Continuing to FIG. 2B, steps 17-24 show the release of the PS side after HO to the CS side. For a detailed description of each step in this figure, please refer to 3GPP TS 23.216.

SUMMARY

Disclosed is a method in a communication system for reducing the media gap (e.g., voice gap, tone gap, or any other media type gap) during initial and/or mid call/session setup where the bearer paths connecting both involved call parties are established independently after the setup procedures are triggered. The method receives a trigger to set up a bearer path connecting a first party (A) and a second party (B) via a media connection function. The method determines a predicted time gap between when the media connection function is expected to receive a bearer packet from the first party (A) and when the media connection function is expected to receive a bearer packet from the second party (B). If the media connection function is expected to receive the bearer packet from the first party (A) prior to receiving the bearer packet from the second party (B), the method delays the connection setup towards the first party (A) based on the predicted time gap. If the media connection function is expected to receive the bearer packet from the second party (B) prior to receiving the bearer packet from the first party (A), the method delays connection setup towards the second party (B) based on the predicted time gap.

Also disclosed is a computer program product for reducing a media gap during initial and/or mid call/session setup where the bearer paths connecting both involved call parties are established independently after the setup procedures are triggered. The computer program product comprises a non-transitory computer readable storage medium having computer readable program code embodied in the medium. The computer readable program code comprises computer readable code to receive a trigger to set up a bearer path connecting a first party (A) and a second party (B) via a media connection function; computer readable code to determine a predicted time gap between when the media connection function is expected to receive a bearer packet from the first party (A) and when the media connection function is expected to receive a bearer packet from the second party (B); computer readable code to, if the media connection function is expected to receive the bearer packet from the first party (A) prior to receiving the bearer packet from the second party (B), delay the connection setup towards the first party (A) based on the predicted time gap; and computer readable code to, if the media connection function is expected to receive the bearer packet from the second party (B) prior to receiving the bearer packet from the first party (A), delay the connection setup towards the second party (B) based on the predicted time gap.

Also disclosed is a communication system for reducing the media gap during initial and/or mid call/session setup where the bearer paths connecting both involved call parties are established independently after the setup procedures are triggered. The communication system receives a trigger to set up a bearer path connecting a first party (A) and a second party (B) via a media connection function. The communication system determines a predicted time gap between when the media connection function is expected to receive a bearer packet from the first party (A) and when the media connection function is expected to receive a bearer packet from the second party (B). If the media connection function is expected to receive the bearer packet from the first party (A) prior to receiving the bearer packet from the second party (B), the communication system delays the connection setup towards the first party (A) based on the predicted time gap. If the media connection function is expected to receive the bearer packet from the second party (B) prior to receiving the bearer packet from the first party (A), the communication system delays connection setup towards the second party (B) based on the predicted time gap.

The call/session can be any type of call/session that is controlled by any type of communication system that anchors the bearer with media connection function(s), and the bearer paths connecting both involved call parties are established independently after their respective setup procedures are triggered.

The media connection function can be separate from the communication system or it can be part of the communication system. In some embodiments, the communication system comprises a control function that is separate from the media connection function. In other embodiments, the communication system comprises a control function that is in the same apparatus as the media connection function.

In certain embodiments, delaying the connection setup towards the first party (A) comprises: starting a timer T before, during, or in response to initiating connection setup toward the second party (B), the timer set according to the predicted time gap; determining that the timer T has expired; and initiating connection setup toward the first party (A) in response to expiry of the timer T. In certain embodiments, delaying the connection setup towards the second party (B) comprises: starting a timer |T| before, during, or in response to initiating connection setup toward the first party (A), the timer set according to the predicted time gap; determining that the timer |T| has expired; and initiating connection setup toward the second party (B) in response to expiry of the timer |T|.

The predicted time gap can be determined based on historical data for a pre-determined number (N) of similar previous calls/sessions. In some embodiments, the control function determines the predicted time gap for the current call/session based at least in part on historical data received from the media connection function and/or the previously used delay timer value(s) used for similar call/session type. The historical data received from the media connection function includes one or more of: information that indicates when the media connection function detected a bearer packet in a previous call/session from a party similar to the first party (A); information that indicates when the media connection function detected a bearer packet in the previous call/session from a party similar to the second party (B); and/or information indicating the difference between when the media connection function detected the bearer packet in the previous call/session from the party similar to the first party (A) and when the media connection function detected the bearer packet in the previous call/session from the party similar to the second party (B) (the difference in timing indicates the media gap of the previous call/session).

Depending on the embodiment, a party can be considered to be similar to the first party (A) in a general sense (e.g., such as the party that performed the handover from packet switched access to circuit switched access in the previous call/session) or in a more specific sense (e.g., such as a party that performed handover in the previous call/session from the location that the first party (A) is performing the handover in the current call/session). In certain embodiments, the target location area code (LAC) can be used as a criterion to identify the location of the first party (A). A party can be considered to be similar to the second party (B) in a general sense (e.g., such as the party on the other end of the previous call/session from the party that performed the handover) or in a more specific sense (e.g., such as a party for which the location of the node that was the connection entry point in the previous call/session is the same as the location of the node that is the connection entry point for the second party (B) in the current call/session). In certain embodiments, such location can be determined based on the session transfer number for single radio (STN-SR).

In certain embodiments, the control function requests the media connection functions to report the historical data. In other embodiments, the media connection function(s) report the historical data without requesting instructions.

In certain embodiments, the media connection function reports the historical data (e.g. the time gap) of the current call/session during the current call/session. Example of reporting the historical data during the current SRVCC call/session can be found in FIG. 6. In other embodiments, the media connection function reports the historical data (e.g., the time gap) after the current call/session is over.

In certain embodiments, data received from the media connection function (which can become part of the historical data for determining the predicted time gap for the next similar call/session type) includes one or more of: information that indicates when the media connection function detected the first relevant bearer packet in a call/session from UE A/party A/node A; information that indicates when the media connection function detected the first relevant bearer packet in the call/session from UE B/party B/node B; and/or information indicating the difference between when the media connection function detected the first relevant bearer packet in a call/session from UE A/party A/node A and when the media connection function detected the first relevant bearer packet in the call/session from UE B/party B/node B.

In certain embodiments, the predicted time gap is determined based on a statistical analysis of a pre-determined number N of similar previous calls/sessions (e.g., the historical data for N similar calls/sessions can include the previous delay timer value(s) used). As examples, the statistical analysis can comprise at least one of: determining an average media gap, a maximum media gap, or a minimum media gap for the pre-determined number N of previous calls/sessions.

The historical data can provide information according to a sliding window such that information for the least recent call/session is removed as information for the most recent call/session is added. In certain embodiments, historical data is grouped such that if the handover request message is for an emergency call/session, each of the pre-determined number N of previous handovers is associated with a previous emergency call/session, and if the handover request message is for a non-emergency call/session, each of the pre-determined number N of previous handovers is associated with a previous non-emergency call/session.

In certain embodiments, the communication system determines an actual media gap between when the media connection function received the bearer packet from the first party (A) and when the media connection function received the bearer packet from the second party (B) and records the actual media gap (that the call/session would have experienced without the delay timer applied) as part of historical data that is used to predict the media gap for similar subsequent calls/sessions.

In certain embodiments, the trigger to set up a bearer path is a handover request message requesting to handover a voice call/session from a packet switched network to a circuit switched network. In certain embodiments, the communication system comprises a mobile switching center (MSC) server that receives the handover request message as a PS to CS Request message from a mobile management entity (MME) or Serving GPRS Support Node (SGSN). Delaying the connection setup towards the first party (A) comprises delaying sending a PS to CS Response message to the MME/SGSN associated with the first party (A). Delaying the connection setup towards the second party (B) comprises delaying sending a session invitation protocol (SIP) Invite message to an internet protocol multimedia subsystem (IMS) associated with the second party (B).

Also disclosed is a method in a communication system working with its media connection function(s) that connects a bearer path between a first party (A) and a second party (B) during a handover from a packet switched network to a circuit switched network. The media connection function can be separate from the communication system or it can be part of the communication system. The method determines timing of a first relevant bearer packet A from the first party (A), determines timing of a first relevant bearer packet B from the second party (B), determines a time gap between relevant bearer packet A and relevant bearer packet B, and updates historical data based on the time gap (e.g., based on the real media gap experienced and any delay timer applied).

Also disclosed is a computer program product for a communication system working with its media connection function(s) that connects a media bearer path between a first party (A) and a second party (B) during a handover from a packet switched network to a circuit switched network. The computer program product comprising a non-transitory computer readable storage medium having computer readable program code embodied in the medium. The computer readable program code comprises computer readable code to determine timing of a first relevant bearer packet A from the first party (A); computer readable code to determine timing of a first relevant bearer packet B from the second party (B); computer readable code to determine a time gap between relevant bearer packet A and relevant bearer packet B; and computer readable code to update historical data based on a real time gap experienced in this handover call/session and any delay timer value applied.

Also disclosed is communication system working with its media connection function(s) that connects a bearer path between a first party (A) and a second party (B) during a handover from a packet switched network to a circuit switched network. The media connection function can be separate from the communication system or it can be part of the communication system. The communication system determines timing of a first relevant bearer packet A from the first party (A), determines timing of a first relevant bearer packet B from the second party (B), determines a time gap between relevant bearer packet A and relevant bearer packet B, and updates historical data based on the time gap (e.g., based on the real media gap experienced and any delay timer applied).

In certain embodiments, updating historical data comprises if the historical data already includes a pre-determined number N of previous handovers, removing information for the least recent handover and adding information for the most recent handover.

Certain embodiment group the historical data. The historical data can be grouped based on one or more of: any criteria that can identify the identity/location of the first party (A) or the identity/location of a node that is the connection entry point for the first party (A), any criteria that can identify the identity/location of the second party (B) or the identity/location of a node that is the connection entry point for the second party (B), and/or the media connection function(s) that connect the bearer path. The target location area code (LAC) can be used as a criterion to identify the location of the first party (A). The session transfer number for single radio (STN-SR) can be used as a criterion to identify the location of the node that is the connection entry point for the second party B.

Certain embodiments group the historical data based on emergency calls/sessions and non-emergency calls/sessions. For the emergency calls/sessions, an emergency session transfer number for SRVCC (E-STN-SR), rather than the STN-SR, is used as a criterion to identify the location of the node that is the connection entry point for the second party B.

BRIEF DESCRIPTION OF THE DRAWINGS

FIG. 11 is an example of a wireless device suitably operative in accordance with certain embodiments; and FIGS. 12A-12B illustrate an example of a communication system, such as a switch or a media gateway, suitably operative in accordance with certain embodiments.

DETAILED DESCRIPTION

Figure 1:
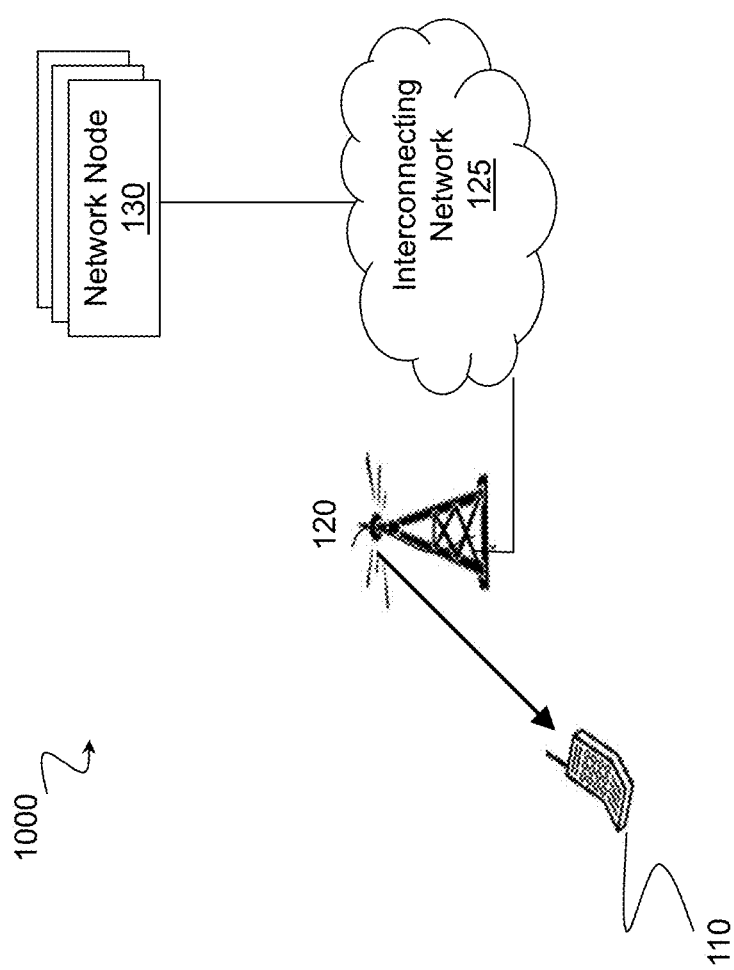
FIG. 1 is a diagram illustrating a wireless communications network.

As discussed above, SRVCC technology offers voice call continuity when a UE moves from packet switched access to circuit switched access. Although the 3GPP TS 23.216 specification includes techniques for SRVCC, it does not coordinate the timing of Tcs (when the UE tunes to radio access connecting to an MSC) with the timing of Tps (when the IMS performs the session transfer and updates the voice/bearer path). Hence, voice interruption occurs during SRVCC. In general, as the duration of the voice gap/interruption increases, the end user experience gets worse. Therefore, a need exists to reduce the voice interruption for SRVCC.

Existing solutions for reducing the voice interruption have certain disadvantages. The ATCF solution introduced by Release 10 SRVCC fails to control the extent to which Tps may be reduced. As an example, if there are multiple nodes between the MSC server and ATCF, Tps may still be much greater than Tcs even if the nodes are in the same network as the MSC server. The solution introduced by EP 2343922 A1 basically eliminates Tps, however, Tcs itself may also be too big and the solution will not help to reduce the voice gap in this case. The solution introduced by EP 2244504 B1 does not specify how the delay timer parameter is set and it cannot take care of the situation where Tps is smaller than Tcs, such as in the case where the MSC server also plays the role of ATCF. Moreover, the solution requires the UE to support the delay. Most UEs do not currently support such a delay, and they are unlikely to add support for such a delay unless this technique is adopted in the 3GPP specifications.

Certain embodiments of the present disclosure may provide improved solutions for reducing media interruption in SRVCC. In some embodiments, the MSC includes MGW functionality or controls an MGW that can detect the time of the first packet from the UE (e.g., time A) and the time of the first bearer packet from the IMS side (e.g., time B). Information related to the two times is reported from the MGW/MGW functionality to the MSC. Examples of such information may include time A, time B, the difference between time A and time B, and/or statistical information, such as a minimum, maximum, or average timing determined at least in part from time A and time B. Based on the report from the MGW/MGW functionality, the MSC may keep a history of the time difference and/or delay timer values, for example, on a per STN-SR and/or per LAC basis. Then for a new SRVCC call/session, the MSC determines a predicted time gap based on the historical data and either delays sending of the PS to CS Response toward the UE (e.g., if the historical data indicates that the first relevant bearer packet from the UE is predicted to be received before the first relevant bearer packet from the IMS), or delays sending of the session transfer message to the IMS (e.g., if the historical data indicates that the first relevant bearer packet from the IMS is predicted to be received before the first relevant bearer packet from the UE).

For purposes of example and explanation, certain embodiments herein are described within the context of SRVCC. However, the proposed solutions also apply more generally to scenarios where a media gap in bearer connectivity can occur, such as scenarios where the bearer path to one party involved in a call/session is established independently of the bearer path to the other party involved in the call/session. The media gap can refer to an interruption of any suitable type of media, such as voice, teletypewriter (TTY), dual tone multi frequency (DTMF) tones or other tones, RTT, video, bearer data, and so on, or any combination of the preceding. Although certain examples herein are described within the context of wireless communication networks, the proposed solutions also apply more generally to any suitable communications system.

Figure 3:
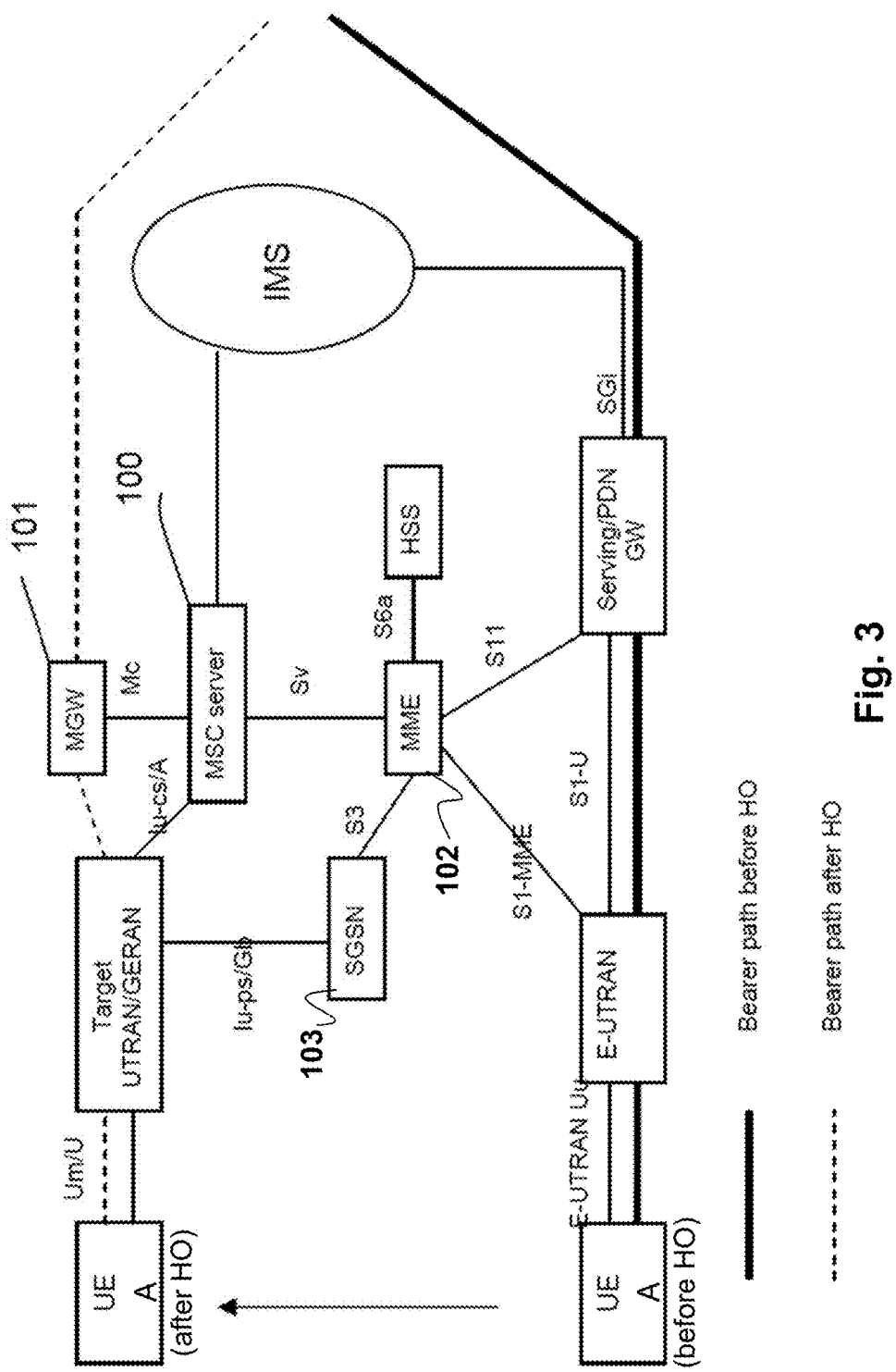
FIG. 3 is a diagram illustrating an SRVCC architecture, in accordance with certain embodiments of the disclosure.

FIG. 3 is a diagram illustrating an SRVCC architecture, in accordance with certain embodiments of the disclosure. In particular, the SRVCC architecture includes MSC server 100 and MGW 101. MGW 101 provides media connection between MSC server 100 and UE A doing the SRVCC handover and media connection between MSC server 100 and connected party/the media entry point of the connected party in the IMS side. For one SRVCC handover call/session, there may be multiple H.248 contexts and more than two termination IDs controlled by one or more than one MGW(s) 101 under MSC server 100. The target UTRAN/GERAN can be under MSC server 100 or under a different MSC server.

To make the description simpler, the followings are assumed: 1) UE A calls party B before the SRVCC handover, 2) UE A needs to handover from LTE coverage (E-UTRAN) to UMTS/GSM coverage (UTRAN/GERAN) 3) from the perspective of MSC server 101, the handover may be initiated by a PS to CS Request message from MME 102 or SGSN 103, 4) the target access is UTRAN/GERAN, and 5). MGW 101 uses—two termination IDs to connect the two independently setup bearer paths, one towards UE A in UTRAN/GERAN and one towards the connected party (party B)/media entry point of the connected party in IMS.

Although these assumptions are made to simplify the description, other SRVCC call/session scenarios can also be used in other embodiments.

Figure 4A:
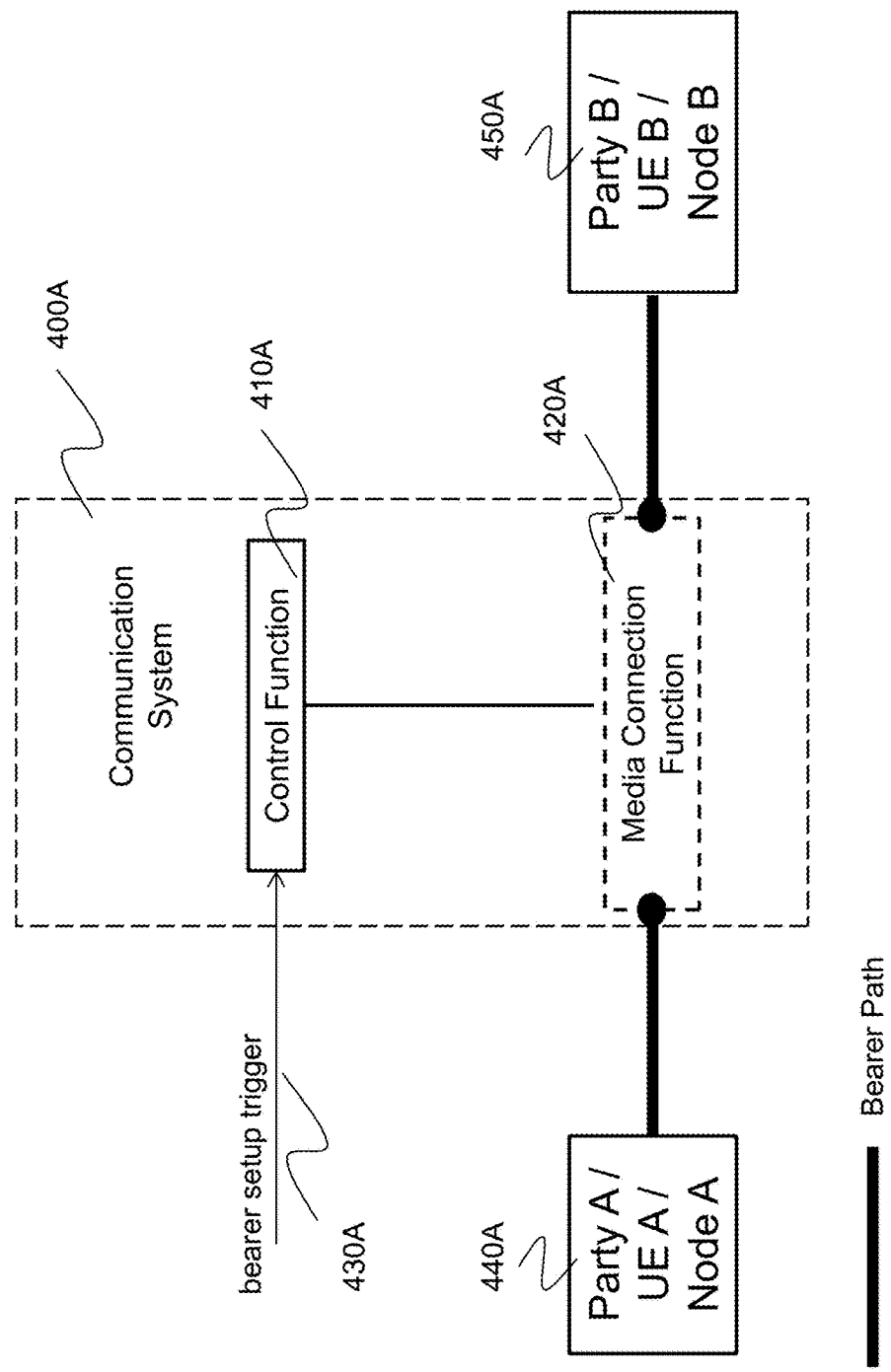
FIG. 4A is a diagram illustrating a bearer path between a first party, party A, and a second party, party B, in accordance with certain embodiments of the disclosure.

FIG. 4A is a diagram illustrating a bearer path between a first party A (e.g., party 440A in FIG. 4A) and a second party B (e.g., party 450A in FIG. 4A), in accordance with certain embodiments of the disclosure. A party may refer to any suitable apparatus capable of communicating media over a bearer path. In FIG. 4A, a communication system 400A connects party A and party B. (The connections to party A and party B may also go through other network nodes, such as any suitable intermediate nodes between the party and media connection function 420A). Communication system 400A comprises a control function 410A and a media connection function 420A. In general, control function 410A provides call/session control functionality, such as managing the establishment of a bearer path in response to a bearer setup trigger 430A. Media connection function 420A provides bearer path connectivity between party A and party B. That is, party A and party B can communicate voice packets or other media traffic via media connection function 420A. Control function 410A and media connection function 420A can refer to functionality within the same apparatus, or the functionality can be separated into multiple apparatuses.

Figure 4B:
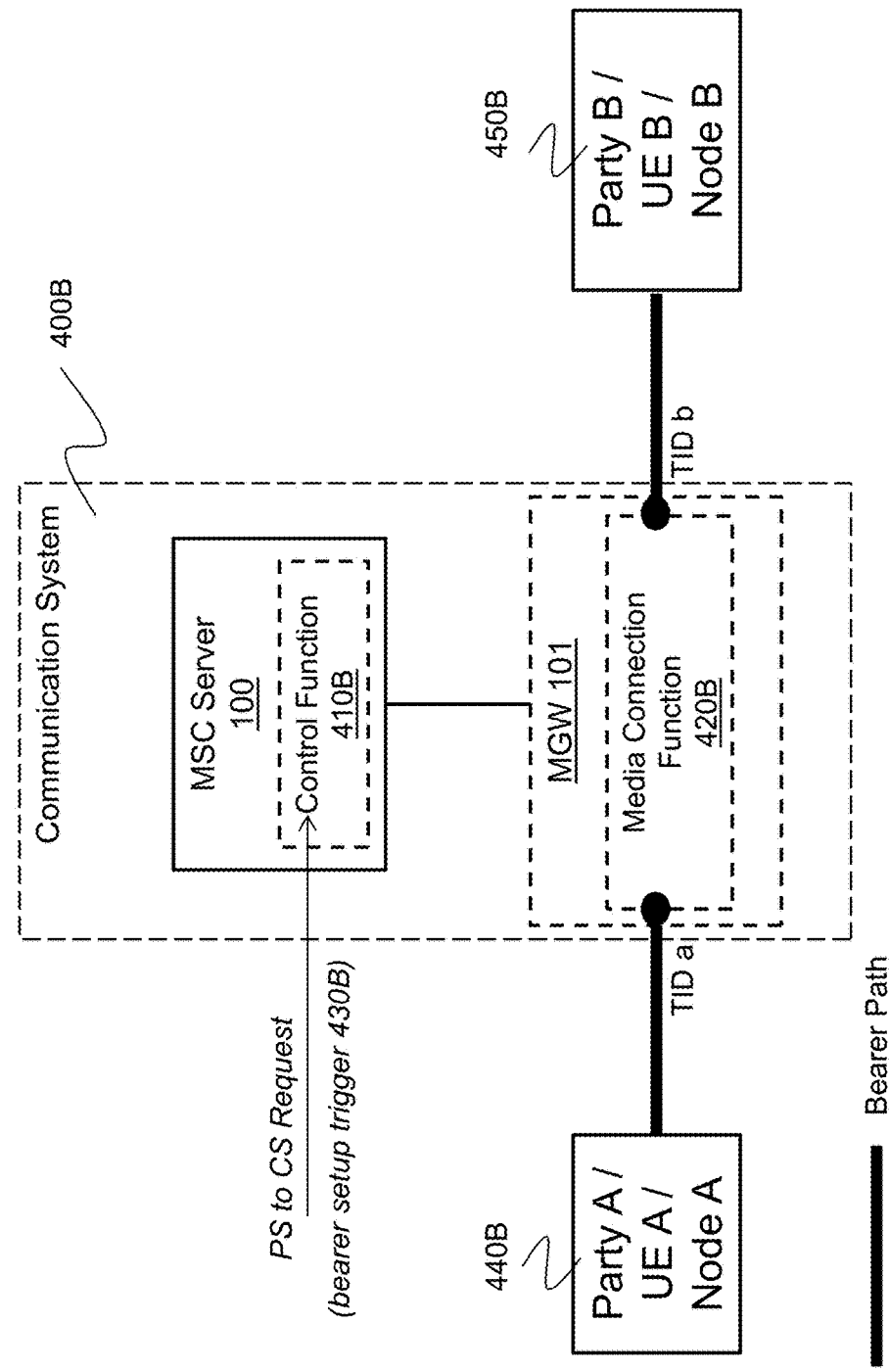
FIG. 4B is a diagram illustrating a bearer path between a first party, party A, and a second party, party B, in accordance with certain embodiments of the disclosure.

FIG. 4B is a diagram illustrating a bearer path between a first party A (e.g., party 440B in FIG. 4B) and a second party B (e.g., party 450B in FIG. 4B), in accordance with certain embodiments of the disclosure. While FIGS. 4A and 4B are generally analogous, FIG. 4B shows additional details of one example embodiment that may be used in SRVCC. In FIG. 4B, communication system 400B includes an MSC server 100 (which comprises control function 410B) and MGW 101 (which comprises media connection function 420B). FIG. 4B further shows receipt of a PS to CS Request message by control function 410B as an example of the bearer setup trigger 430B.

A party may refer to any suitable apparatus from which MGW 101 detects media packets. In certain embodiments, party A may be a UE that is in a SRVCC handover from packet switched access to circuit switched access. In other embodiments, party A may be another interconnect node from which MGW 101 detects media packets, such as the RNC or the target handover MSC's MGW (which can be different from MSC SRVCC server 100 and MGW 101). In certain embodiments, party B may be another UE, UE B, on the other end of the bearer path. In other embodiments, party B may be another node from which MGW 101 detects media packets, such as an IMS.

FIG. 4B shows the bearer path after SRVCC according to the assumptions discussed above with respect to FIG. 3. In FIG. 4B, termination identity A (TIDa) communicates the bearer with party A/UE A and termination identity B (TIDb) communicates the bearer with Party B/UE B/Node B. MSC server 100 controls one or more MGW(s) 101 to provide this bearer path connectivity. In certain embodiments, certain MSC server 100 functionalities and MGW 101/media gateway functionalities may optionally be located within the same apparatus. In other embodiments, certain MSC server 100 functionalities and MGW 101 functionalities may be located in separate apparatuses.

Figure 2A:
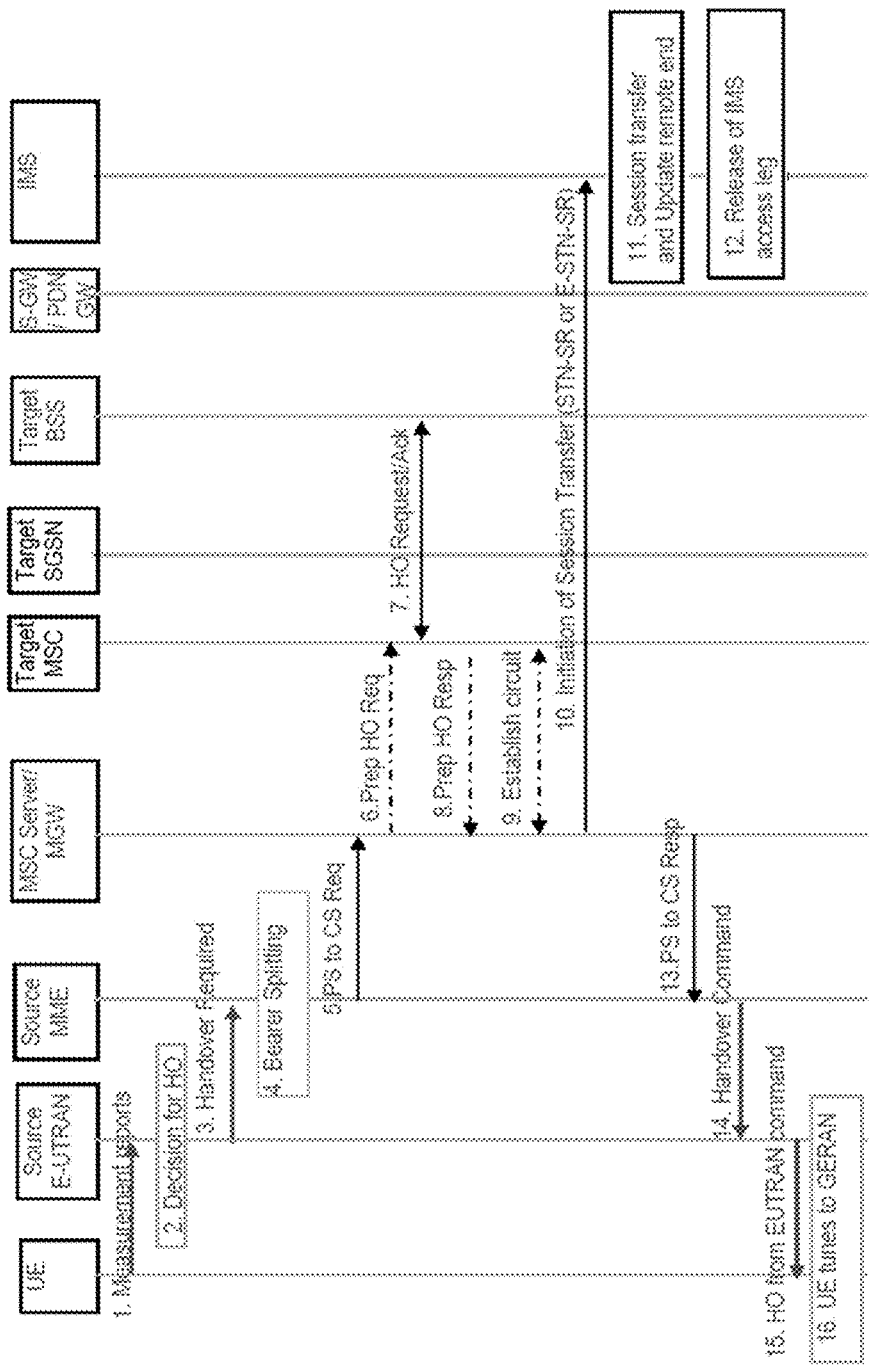
FIGS. 2A-2B illustrate a single radio voice call continuity (SRVCC) message flow according to 3GPP TS 23.216.
Figure 2B:
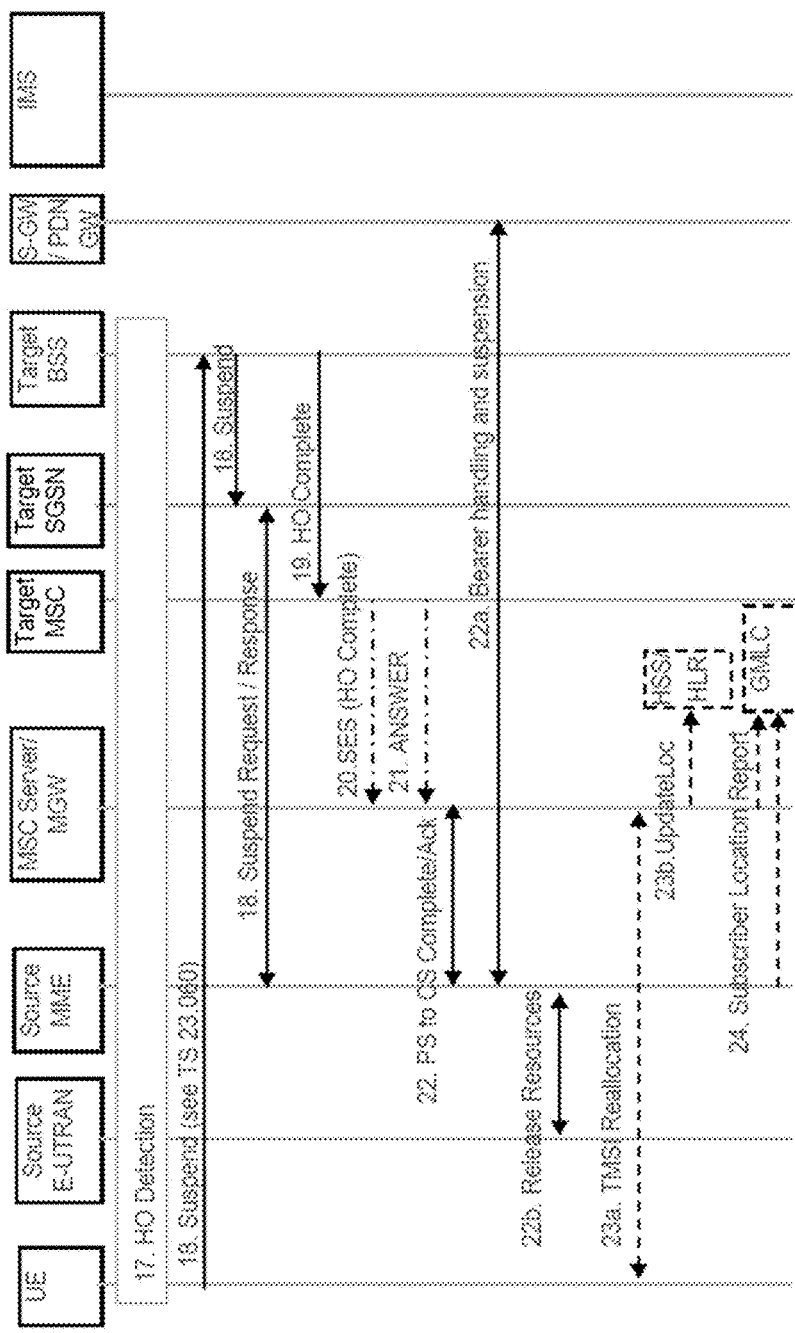
Figure 5:
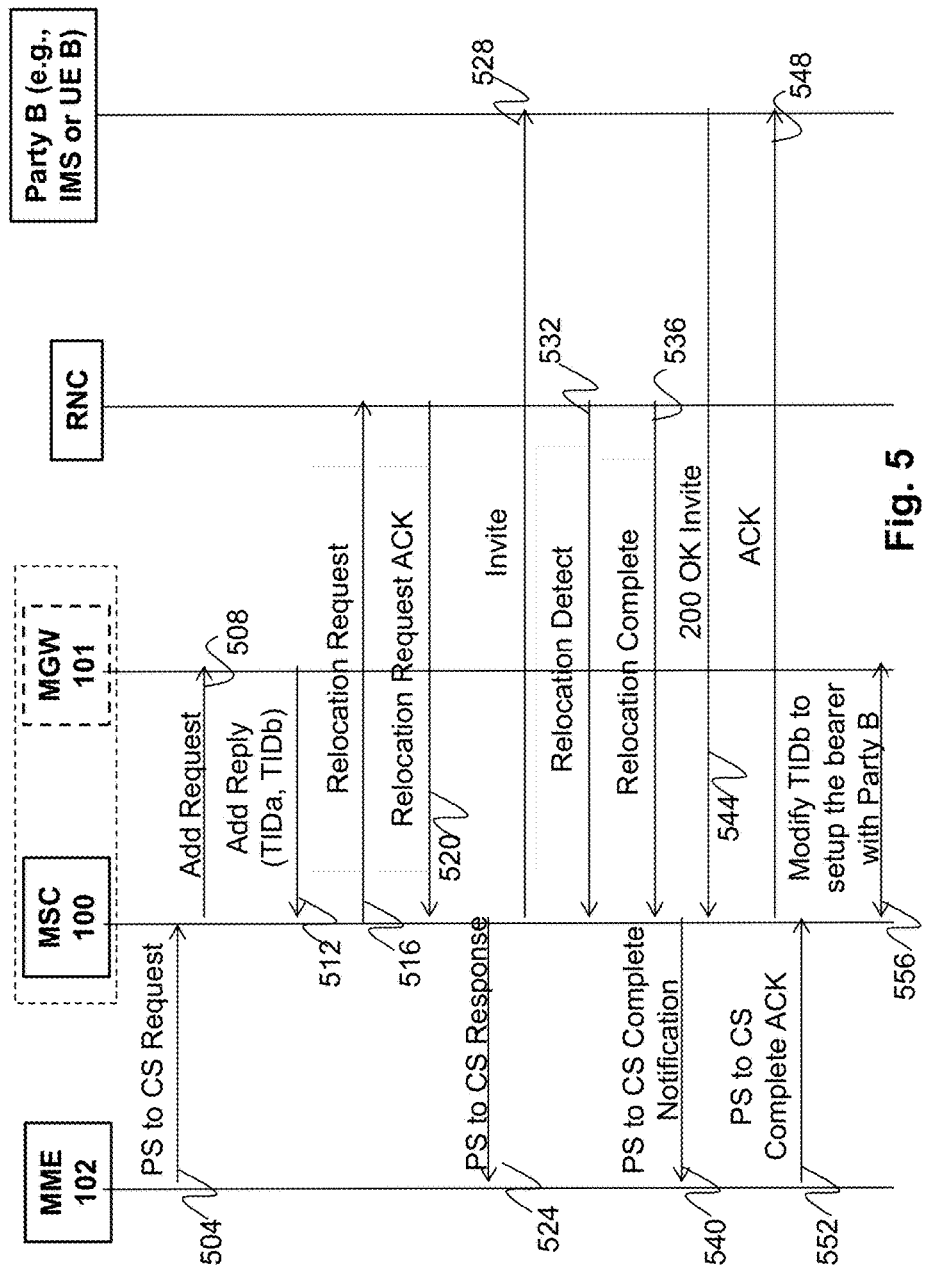
FIG. 5 illustrates a SRVCC message flow, in accordance with certain embodiments of the disclosure.

FIG. 5 illustrates a SRVCC message flow, in accordance with certain embodiments of the disclosure. The message flow is similar to that shown in FIGS. 2A-2B. In addition, FIG. 5 shows messages between MSC server 100 and MGW 101 (which may be a separate apparatus or functionality within the same apparatus as MSC server 100). At step 504, MME 102 sends a PS to CS Request to the MSC server 100 in order to initiate a handover of Party A/UE A to a target RNC. In response, MSC server 100 sends an Add Request to MGW 101 at step 508. MGW 101 responds by sending MSC server 100 an Add Reply at step 512. The Add Reply includes TIDa and TIDb. MSC server 100 sends a Relocation Request to the target RNC at step 516 and receives a Relocation Request Acknowledgement from the RNC at step 520.

At step 524, MSC server 100 sends a PS to CS Response to MME 102 to initiate the connection setup towards party A/UE A. At step 528, MSC server 100 sends an Invite to initiate the connection setup towards party B (e.g., IMS or UE B). The RNC sends MSC server 100 a Relocation Detect message and a Relocation Complete message at steps 532 and 536, respectively. Sometime after step 536, MGW 101 detects the first media packet (the media packet may also be referred to as a bearer packet) from UE A under TIDa. MSC server 100 sends a PS to CS Complete Notification to MME 102 at step 540.

MSC server 100 receives a 200 OK Invite from Party B (e.g., IMS or UE B) at step 544 and MSC server 100 sends an Acknowledgement in response (step 548). At step 552, MSC server 100 receives a PS to CS Complete Acknowledgement. At step 556, MSC server 100 and MGW 101 exchange messages to modify the TIDb to setup the bearer with Party B. Sometime after modifying the TIDb, MGW 101 detects the first media packet from Party B.

Because the connection setup toward party A proceeds independently from the connection setup toward party B, a media interruption (media gap) can occur. It is possible that MGW 101 detects the first media packet from party A/UE A prior to detecting the first media packet from party B/UE B/Node B, or vice versa. The media interruption time will be approximately the difference between the time when MGW 101 detects the first media packet from party A/node A/UE A (Ta) and the time when MGW 101 detects the first media packet from party B/UE B/Node B (Tb).

Figure 6:
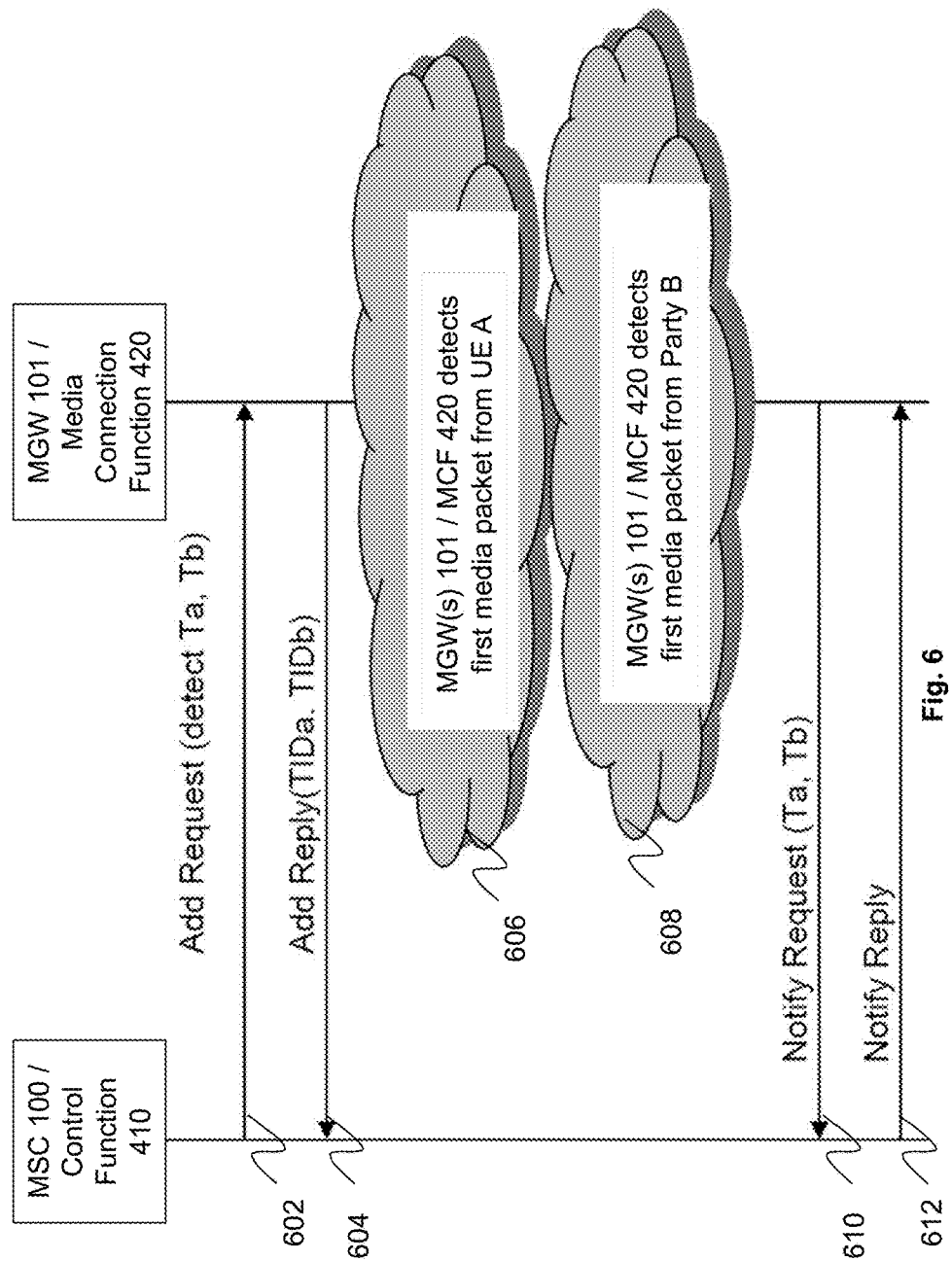
FIG. 6 illustrates a message flow in which a media gateway reports packet timing information to a switch, in accordance with certain embodiments of the disclosure.

FIG. 6 illustrates a message flow in which a media connection function 420 reports packet timing information to a control function 410, in accordance with certain embodiments of the disclosure. In certain embodiments, control function 410 may be functionality of an MSC server 100 and media connection function 420 may be functionality of an MGW 101, however, other embodiments may use any other suitable control function 410 and media connection function 420. At step 602, control function 410 sends media connection function 420 an Add Request that asks media connection function 420 to detect the timing (Ta) of the first relevant bearer packet from UE A under TIDa and to detect the timing (Tb) of the first relevant bearer packet from Party B under TIDb. At step 604, media connection function 420 sends control function 410 an Add Reply acknowledging the Add Request. At step 606, media connection function 420 detects the first relevant bearer packet from UE A and at step 608 media connection function 420 detects the first relevant bearer packet from Party B. Depending on various network conditions, the first relevant bearer packet from UE A may be detected before, after, or at the same time as the first relevant bearer packet from Party B. At step 610, media connection function 420 sends a Notify Request 610 to report timing information to control function 410. The Notify Request 610 may include Ta, Tb, and or their difference (Tb−Ta). FIG. 6 illustrates an example where media connection function 420 reports Ta and Tb in one message, however, in other embodiments, media connection function 420 can report Ta and Tb in separate messages. At step 612, control function 410 sends media connection function 420 a Notify Reply in response to the Notify Request.

In certain embodiments, control function 410 saves historical data for up to N previous calls/sessions, where N is a number chosen by implementation. The historical data can be used to predict the duration of the media gap in subsequent calls/sessions. As examples, the predicted time gap could be based on a minimum media gap, maximum media gap, average media gap, or other statistical information for the N most recent calls/sessions. Tables 1-3 below provide some more specific examples in the context of SRVCC. Analogous principles may be applied more generally to other scenarios that are susceptible to a voice gap. Analogous principles also may be applied more generally to other media scenarios that are susceptible to a media connection gap (e.g. TTY gap, Fax gap, inband DTMF packet gap, RTT gap).

In certain embodiments, the historical data may include the actual media gap (Td=Tb−Ta+T) that would have experienced without delay timer (T) applied for up to N SRVCC calls/sessions. It should be noted that Tb−Ta is basically the real bearer gap experienced in a call/session after the timer T is applied and Td is basically the bearer gap the user would have experienced without the delay timer applied. Td can be a positive number, zero, or a negative number. Table 1 shows an example of this approach.

TABLE 1

Saving the time difference in MSC for all SRVCC calls

| 1 | 2 | ... | N − 1 | N |
|---|---|-----|-------|---|
| Td(1) | Td(2) | ... | Td(N − 1) | Td(N) |

Table 1 can be updated according to a sliding window such that information for the least recent call/session is removed as information for the most recent call/session is added. As an example, Td(1) is removed when Td(N+1) is added.

In certain embodiments, the idea illustrated in Table 1 can be fine-tuned such that MSC server 100 saves data separately for SRVCC calls/sessions with different STN-SRs and E-STN-SRs (Emergency Session Transfer Number for SRVCC) because one STN-SR/E-STN-SR identifies one node in the IMS side. For simplicity, only STN-SR is mentioned in the rest of this document, however, it should be understood that E-STN-SRs could also be used. The fine-tuned idea is as shown in Table 2:

TABLE 2

Saving the time difference in MSC for different STN-SRs

|  | 1 | 2 | ... | N − 1 | N |
|---|---|---|-----|-------|---|
| STN-SR 1 | Td(1)(1) | Td(2)(1) | ... | Td(N − 1)(1) | Td(N)(1) |
| STN-SR 2 | Td(1)(2) | Td(2)(2) | ... | Td(N − 1)(2) | Td(N)(2) |
| ... | ... | ... | ... | | |
| STN-SR X | Td(1)(X) | Td(2)(X) | ... | Td(N − 1)(X) | Td(N)(X) |

Table 2 includes one row per STN-SR, for example, STN-SR 1, STN-SR 2, . . . STN-SR X, where X is a number chosen by implementation based on the number of STN-SRs configured. Table 2 includes columns 1 through N to store historical data for up to N SRVCC calls/sessions per STN-SR. As an example, the cell at the intersection of row STN-SR 1 and column 1 contains the value for Td(1)(1), which is the difference between time Tb of call/session 1 for which STN-SR 1 does the bearer path update during SRVCC and time Ta of call/session 1 for which STN-SR 1 does the bearer path update during SRVCC, plus the delay timer value if applied.

Table 2 can be updated according to a sliding window such that information for the least recent call/session is removed as information for the most recent call/session is added. As an example, Td(1)(1) is removed when Td(N+1)(1) is added. Similarly, Td(1)(X) is removed when Td(N+1)(X) is added.

In certain embodiments, the idea illustrated in Table 1 can be fine-tuned such that MSC server 100 saves data separately for the SRVCC call/session with different STN-SR and target LAC combination. This fine-tuned idea is as shown in Table 3:

TABLE 3

Saving the time difference in MSC for different STN-SR and LAC combinations

|  | 1 | 2 | ... N − 1 | N |
|---|---|---|-----------|---|
| STN-SR-LAC 1 | Td(1)(1) | Td(2)(1) | ... Td(N − 1)(1) | Td(N)(1) |
| STN-SR-LAC 2 | Td(1)(2) | Td(2)(2) | ... Td(N − 1)(2) | Td(N)(2) |
| ... | ... | ... | ... | |
| STN-SR-LAC X | Td(1)(X) | Td(2)(X) | ... Td(N − 1)(X) | Td(N)(X) |

Table 3 can be updated according to a sliding window such that information for the least recent call/session is removed as information for the most recent call/session is added.

Although certain tables have been provided for purposes of example and explanation, control function 410/MSC server 100 can save the time difference for other suitable combinations which can be used to group different SRVCC calls/sessions. In addition, although the historical data has been described as being stored by control function 410/MSC server 100, in other embodiments, media connection function 420/MGW 101 can store the historical data and can use the historical data when reporting timing information to control function 410/MSC server 100 (e.g., according to techniques described with respect to FIG. 6 above and/or FIG. 10 below). For example, in certain embodiments, the timing information that media connection function 420/MGW 101 sends to control function 410/MSC server 100 could be statistical information (e.g., minimum Td, maximum Td, average Td, or other statistical information) based on the N most recent SRVCC calls/sessions.

Another aspect of certain embodiments is that MSC server 100 delays either PS to CS Response to MME or session initiation protocol (SIP) Invite to IMS adaptively.

Figure 8:
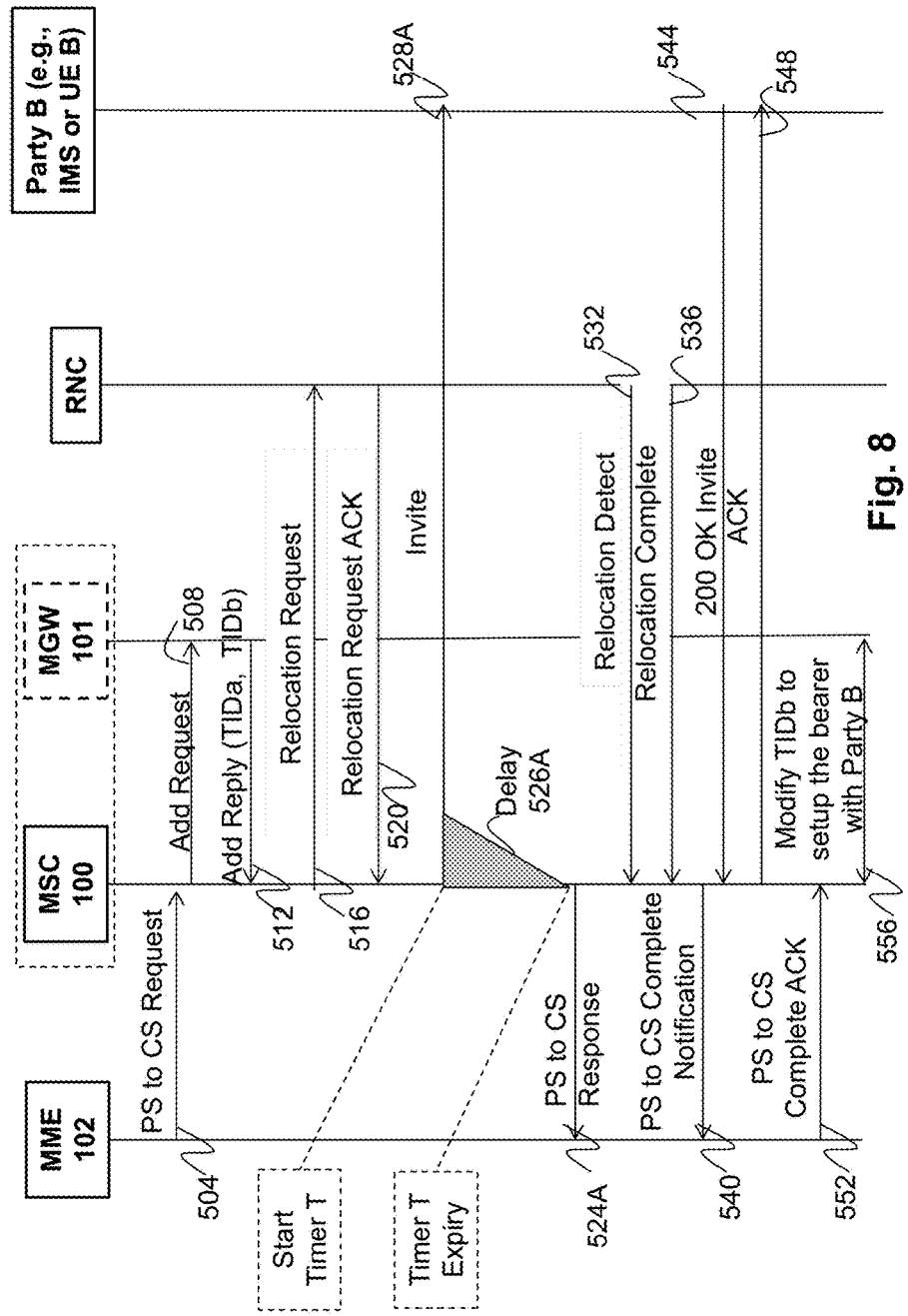
FIG. 8 illustrates a SRVCC message flow in which a connection setup towards a first party, party A, is delayed based on a prediction that a packet from party A is expected to be received prior to a packet from a second party, party B, in accordance with certain embodiments.
Figure 9:
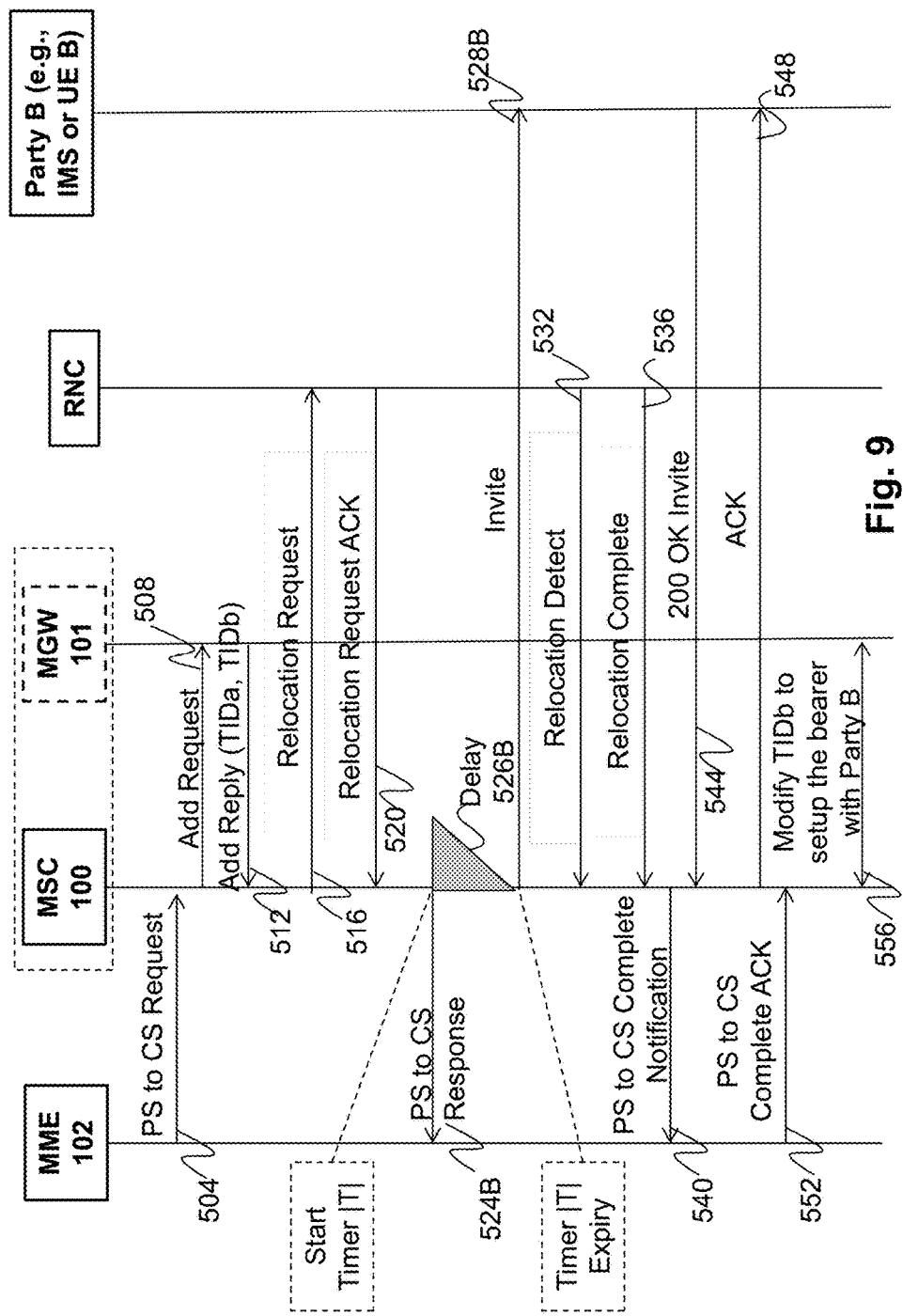
FIG. 9 illustrates a SRVCC message flow in which a connection setup towards a second party, party B, is delayed based on a prediction that a packet from party B is expected to be received prior to a packet from a first party, party A, in accordance with certain embodiments.

Based on the historic data captured, an example formula using Table 1 in calculating the delay timer value T for a new SRVCC call/session can be: T=Tdav, where Tdav is the average of Td(1), Td(2), . . . , Td(N). If Tdav is greater than 0, then MSC server 100 delays sending PS to CS Response by Tdav (e.g., as shown in FIG. 8 below). If the Tdav is less than 0, MSC server 100 delays sending SIP Invite by the absolute value of Tdav (e.g., as shown in FIG. 9 below).

Optionally, for the initial X (e.g., X can be N) SRVCC calls/sessions identified by the chosen group as shown in tables 1, 2, and 3, the MSC server 100 is in learning stage. During the learning stage, it may simply collect Td and save Td in its internal tables.

Figure 7:
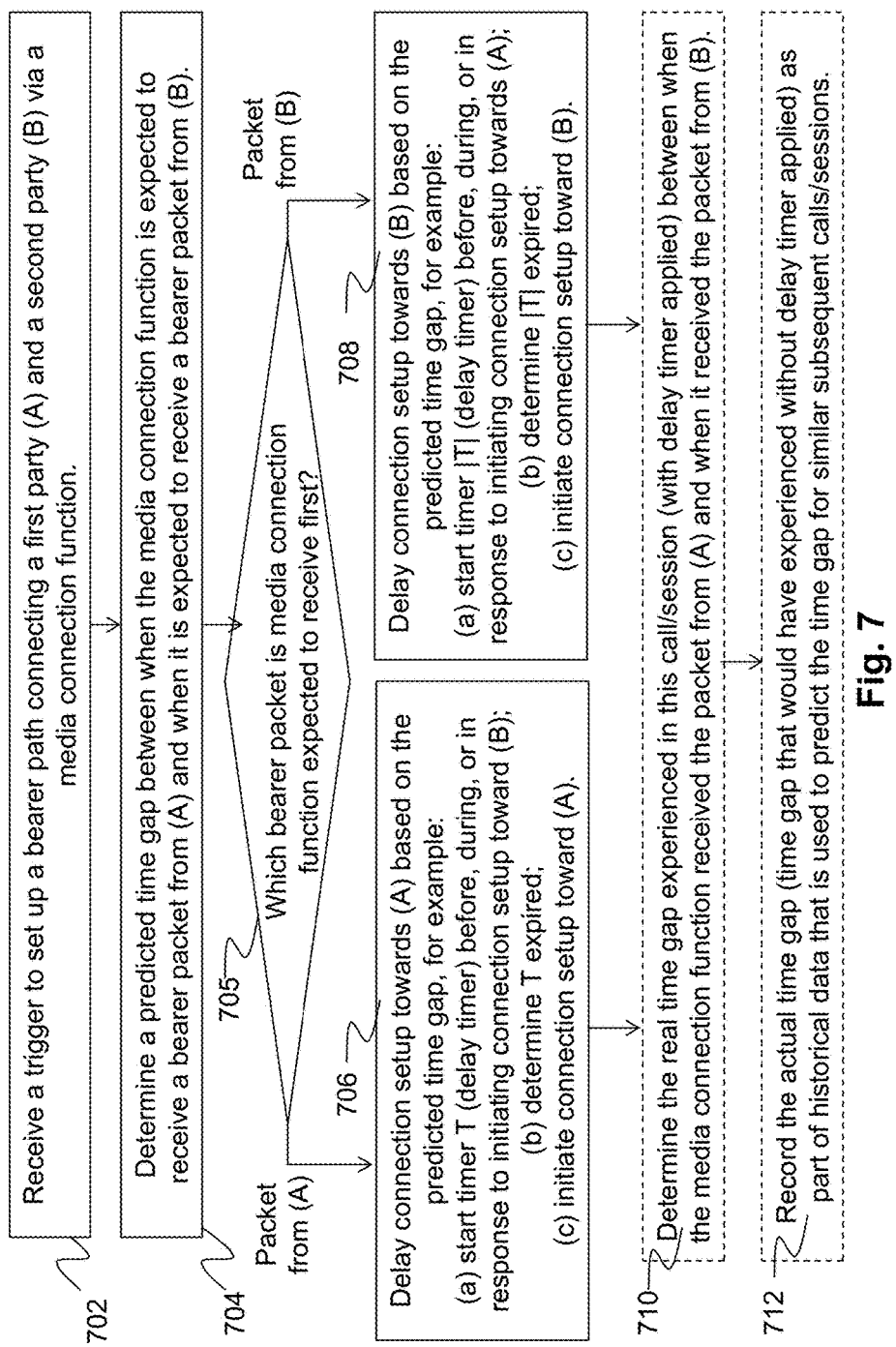
FIG. 7 is a flow chart illustrating a method for reducing media gap when connecting independent bearer paths, in accordance with certain embodiments.

FIG. 7 is a flow chart illustrating a method for reducing media gap when connecting independent bearer paths, in accordance with certain embodiments. The connected bearer paths may be used to communicate bearer packets between involved parties, and the bearer path to each involved party can be established independently after setup procedures are triggered. Bearer paths that are established independently tend to be prone to interruption/media gap. The steps described below may allow for reducing or eliminating the media gap.

The method of FIG. 7 may be performed by any suitable communication system 400, such as any control function 410 that anchors the bearer with media connection function 420. Examples include a switch, a server, a terminal, a computer, or an application. More specifically, in certain embodiments, the method may be performed by a switch or server comprising control function 410 (e.g., MSC server 100) or a node comprising such switch or server. MSC server 100 may be communicatively coupled to an MGW 101 that comprises media connection function 420. MGW 101 can be either a separate apparatus or functionality within the same apparatus as MSC server 100. The method may be performed at any suitable point in the call/session, such as during initial setup or sometime mid call/session.

At step 702, communication system 400 receives a trigger to set up a bearer path connecting a first party (A) and a second party (B) via a media connection function 420. Examples of first party (A) (e.g., party A/UE A/node A) and second party (B) (e.g., party B/UE B/node B) were previously described with respect to FIGS. 4A-4B above. In certain embodiments, setting up the bearer path is triggered by receipt of a handover request message in control function 410. As an example, the control function 410 of MSC server 101 may receive a request to handover a voice call/session from a packet switched network to a circuit switched network in the form of a PS to CS Request message from an MME 102 or an SGSN 103 that supports the first party (A).

At step 704, communication system 400 determines a predicted time gap between when media connection function 420 is expected to receive a bearer packet from the first party (A) and when media connection function 420 is expected to receive a bearer packet from the second party (B). The predicted time gap can be determined based on historical data for a pre-determined number (N) of similar previous calls/sessions and the previous delay timer used. Any suitable technique can be used to group previous calls/sessions together as similar calls/sessions. For example, calls/sessions may be grouped based on any criteria that can identify the location of the first party (A), any criteria that can identify the location of a node that is the connection entry point for the second party (B); and/or the particular media connection function 420 that connects the bearer path. More specific examples of such groupings are described above with respect to Table 1 (where all SRVCC calls/sessions involving MGW 101 are treated as similar calls/sessions), Table 2 (where SRVCC calls/sessions associated with the same STN-SR are treated as similar calls/sessions), and Table 3 (where SRVCC calls/sessions associated with the same combination of STN-SR and LAC are treated as similar calls/sessions).

In certain embodiments, communication system 400 groups emergency calls/sessions separately from non-emergency calls/sessions. For example, if at step 702 communication system 400 received a handover request message for an emergency call/session, each of the N previous handovers used to determine the predicted time gap at step 704 would be associated with a previous emergency call/session. On the other hand, if at step 702 communication system 400 received a handover request for a non-emergency call/session, each of the N previous handovers used to determine the predicted time gap at step 704 would be associated with a previous non-emergency call/session. In certain embodiments, emergency calls/sessions may be grouped based on the use of an E-STN-SR to do the bearer path update during SRVCC, whereas non-emergency calls/sessions may be grouped based on the use of an STN-SR (rather than an E-STN-SR) to do the bearer path update during SRVCC.

In certain embodiments, communication system 400 determines the predicted time gap based on historical data received from media connection function 420 (for example, as described with respect to FIG. 6 above and FIG. 10 below) and previous delay timer used. In certain embodiments, the predicted time gap is determined based on a statistical analysis of the pre-determined number N of similar previous calls/sessions. The statistical analysis can include one or more of determining an average media gap for the pre-determined number N of previous calls/sessions, determining a maximum media gap for the pre-determined number N of previous calls/sessions, and/or determining a minimum media gap for the pre-determined number N of previous calls/sessions.

The historical data may provide timing information according to a sliding window such that information for the least recent call/session is removed as information for the most recent call/session is added. Thus, if the historical data includes timing information for calls/sessions 1, 2, 3, ... N, in the order of oldest to newest, the timing information for call/session 1 would be removed when information for call/session (N+1) is added.

At step 705, communication system 400 determines which bearer packet media connection function 420 is expected to receive first. If at step 705 communication system 400 determines that media connection function 420 is expected to receive the bearer packet from the first party (A) prior to receiving the bearer packet from the second party (B), communication system 400 proceeds to step 706 and delays the connection setup towards the first party (A) based on the predicted time gap. On the other hand, if at step 705 communication system 400 determines that media connection function 420 is expected to receive the bearer packet from the second party (B) prior to receiving the bearer packet from the first party (A), communication system 400 skips step 706 and proceeds directly to step 708 where communication system 400 delays the connection setup towards the second party (B) based on the predicted time gap.

With respect to step 706, in certain embodiments, delaying the connection setup towards the first party (A) includes sub-step 706a, starting a timer T. The timer T can be started before, during, or in response to initiating the connection setup towards the second party (B). As an example, timer T can be started in response to sending a connection setup message, such as a SIP Invite, to the second party (B). The timer is set according to the predicted time gap determined at step 704. As one example, the predicted time gap could be the average media gap for the pre-determined number N of previous calls/sessions. Delaying the connection setup towards the first party (A) further includes sub-step 706b, determining that the timer T has expired, and sub-step 706c, initiating the connection setup towards the first party (A) in response to expiry of the timer T, for example, by sending a connection setup message to the first party (A). As an example, FIG. 8 below illustrates an embodiment where the connection setup message that gets delayed until the expiry of timer T is the PS to CS Response message to the MME/SGSN associated with the first party (A). After delaying the connection setup towards (A), communication system 400 may skip to step 710.

With respect to step 708, in certain embodiments, delaying the connection setup towards the second party (B) includes sub-step 708a, starting a timer |T|. The timer |T| can be started before, during, or in response to initiating the connection setup towards the first party (A). As an example, timer |T| can be started in response to sending a connection setup message, such as the PS to CS Response message, to the first party (A). The timer is set according to the predicted time gap determined at step 704. As one example, the predicted time gap could be the average media gap (actual media gap that would have experienced without delay timer applied) for the pre-determined number N of previous calls/sessions. Delaying the connection setup towards the second party (B) further includes sub-step 708b, determining that the timer |T| has expired, and sub-step 708c, initiating the connection setup towards the second party (B) in response to expiry of the timer |T|, for example, by sending a connection setup message to the second party (B). As an example, FIG. 9 below illustrates an embodiment where the connection setup message that gets delayed until the expiry of timer |T| is the SIP Invite message to the IMS associated with the second party (B). After delaying the connection setup towards (B), network node 130 may proceed to step 710.

Steps 710-712 are steps that can be used to update historical data in accordance with certain embodiments. At step 710, communication system 400 determines an actual media gap (time gap that would have experienced without delay timer applied), Td, between Ta (when media connection function 420 received the first bearer packet from the first party (A)) and Tb (when media connection function 420 received the first bearer packet from the second party (B)). For example, FIG. 6 above illustrates an embodiment where control function 410 of communication system 400 requests media connection function 420 to report timing information, such as Td (or Ta and Tb from which control function 410 can calculate Td). At step 712, communication system 400 records the actual media gap (Td) (time gap that would have experienced without delay timer applied) as part of historical data that is used to predict the media gap for similar subsequent calls/sessions. If recording the actual media gap causes the historical data to exceed the pre-determined number (N) of entries, communication system 400 may remove timing information associated with the least recent call/session.

FIG. 8 illustrates a SRVCC message flow in which a connection setup towards a first party, party A, is delayed based on a prediction that a packet from party A is expected to be received prior to a packet from a second party, party B, in accordance with certain embodiments. The message flow in FIG. 8 is generally analogous to that previously described with respect to FIG. 5. In FIG. 8, prior to sending the connection setup toward either party, MSC server 100 determines a predicted time gap between when MGW 101 is expected to receive a bearer packet from (A) and when MGW 101 is expected to receive a bearer packet from (B). In the example, the predicted time gap indicates that MGW 101 is expected to receive the bearer packet from (A) before receiving the bearer packet from (B). In response, MSC server 100 sends the Invite to (B) at step 528A and starts timer T. Timer T is set according to the predicted time gap in order to introduce delay 526A in the connection setup toward (A). At the expiry of timer T, MSC server 100 sends the PS to CS Response 524A toward (A). Thus, the connection setup toward (A) can be delayed in order to reduce the media gap/increase the likelihood that MGW 101 receives the first packet from (A) and the first packet from (B) at approximately the same time.

FIG. 9 illustrates a SRVCC message flow in which a connection setup towards a second party, party B, is delayed based on a prediction that a packet from party B is expected to be received prior to a packet from a first party, party A, in accordance with certain embodiments. The message flow in FIG. 9 is generally analogous to that previously described with respect to FIG. 5. In FIG. 9, prior to sending the connection setup toward either party, MSC server 100 determines a predicted time gap between when MGW 101 is expected to receive a bearer packet from (A) and when MGW 101 is expected to receive a bearer packet from (B). In the example, the predicted time gap indicates that MGW 101 is expected to receive the bearer packet from (B) before receiving the bearer packet from (A). In response, MSC server 100 sends the PS to CS Response to (A) at step 524B and starts timer |T|. Timer |T| is set according to the predicted time gap in order to introduce delay 526B in the connection setup toward (B). The timer value |T| may refer to the absolute value of the difference between the expected Tb and the expected Ta such that the timer value is not a negative number when the expected Ta>expected Tb. At the expiry of timer |T|, MSC server 100 sends the Invite 528(B) toward (B). Thus, the connection setup toward (B) can be delayed in order to reduce the media gap/increase the likelihood that MGW 101 receives the first packet from (A) and the first packet from (B) at approximately the same time.

Figure 10:
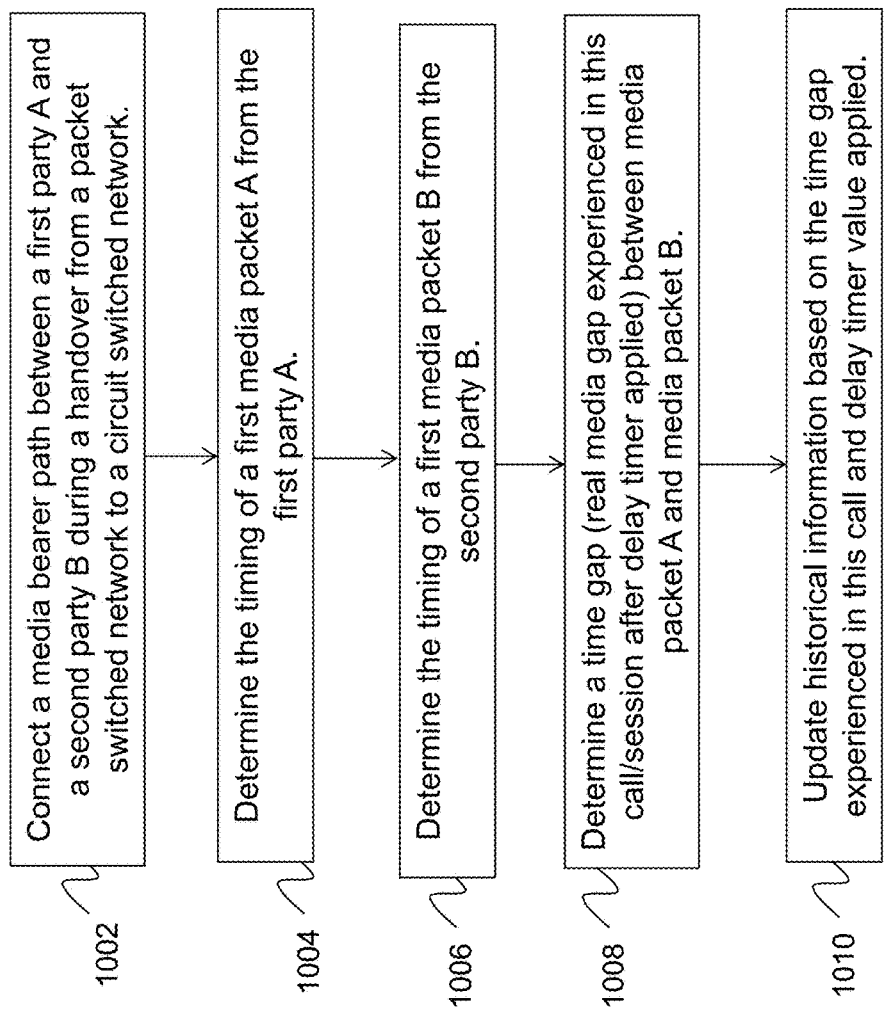
FIG. 10 is a flow chart for updating historical data based on an actual media gap experienced in a call/session and the delay timer value if applied, in accordance with certain embodiments.

FIG. 10 is a flow chart for updating historical data based on a media gap (real media gap experienced in this call/session after delay timer applied+delay timer value applied in this call/session), in accordance with certain embodiments. The steps may be performed by any suitable component(s) of communication system 400, such as media connection function 420, or control function 410 working with its associated media connection function 420 (e.g., the media connection function 420 that connect a bearer path between a first party (A) and a second party (B) during a handover from a packet switched network to a circuit switched network). At step 1004, communication system 400 determines the timing (Ta) of a first media packet A from the first party (A) and at step 1006, communication system 400 determines the timing (Tb) of a first media packet B from the second party (B). As an example, media connection function 420 may determine the timing based on detecting media packet A and detecting media packet B. As another example, control function 410 may determine the timing based on one or more than one report(s) from media connection function 420. At step 1008, communication system 400 determines a real media gap between media packet A and media packet B. The real media gap may be calculated as the difference (Trd) between the timing of the first media packet A and the first media packet B (e.g., Trd=Tb−Ta). At step 1010, communication system 400 updates historical data based on the media gap (Trd) experienced in the call/session and the delay timer value applied (the media gap (Trd) experienced in the call/session and the delay timer value applied can be used to determine the actual media gap that would have been experienced if the delay timer value was not applied). As an example, either control function 410 or media connection function 420 could store data such as Trd (Ta and Tb) and delay time value applied in a table, such as any one or more of Tables 1-3 described with respect to FIG. 6 above. In certain embodiments, media connection function 420 could cause the historical data to be updated by reporting data such as Td to control function 410.

In certain embodiments, communication system 400 groups the historical data. The historical data can be grouped based on any suitable criteria, such as any one or more of: (1) any criteria that can identify the location of the first party (A), (2) any criteria that can identify the location of a node that is the connection entry point for the second party (B), and/or (3) the particular media control function 420 (e.g., MGW(s) 101) that connect the bearer path. An example of criterion to identify the location of the first party (A) is target location area code (LAC). An example of criterion to identify the location of the second party (B) is session transfer number for single radio (STN-SR). In certain embodiments, communication system 400 groups the historical data based on emergency calls/sessions and non-emergency calls/sessions. For the emergency calls/sessions, an emergency session transfer number for SRVCC (E-STN-SR), rather than the STN-SR, is used as a criterion to identify the location of the node that is the connection entry point for the second party (B).

In certain embodiments, if the historical data already includes a pre-determined number N of previous handovers, updating the historical data further comprises removing information for the least recent handover and adding information for the most recent handover.

FIG. 11 is an example of a wireless 110 device suitably operative in accordance with certain embodiments. Examples of the wireless device include a cellular UE, a mobile phone, a smart phone, a PDA (Personal Digital Assistant), a portable computer (e.g., laptop, tablet), a radio receiver, or other device that can provide wireless communication or employ a UE-like interface. A UE-like interface may comprise any entity capable of at least receiving or transmitting radio signals either via a direct link (e.g., between two UEs) or a link to a radio network or both. The wireless device comprises transceiver 1110, processor 1120, and memory 1130. In some embodiments, transceiver 1110 facilitates transmitting wireless signals to and receiving wireless signals from a radio access node 120 (e.g., via an antenna), processor 1120 executes instructions to provide some or all of the functionality described above as being provided by wireless devices, and memory 1130 stores the instructions executed by processor 1120.

Processor 1120 may comprise any suitable combination of hardware and software implemented in one or more modules to execute instructions and manipulate data to perform some or all of the described functions of the wireless device. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application comprising one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Alternative embodiments of the wireless device may include additional components beyond those shown in FIG. 11 that may be responsible for providing certain aspects of the wireless device's functionality, including any of the functionality described herein and/or any additional functionality (including any functionality necessary to support the solution described herein).

FIGS. 12A-12B illustrate example components of communication system 400. In certain embodiments, communication system 400 may comprise one or more network nodes 130, such as MSC server 100 and/or MGW 101. MSC server 100 and MGW 101 functionality can be combined within the same network node 130 or separated into different network nodes 130. In other embodiments, communication system 400 can comprise any suitable switch, server, terminal, computer, or application. For example, the control function 410 and/or media connection function 420 of a communication system 400 can be implemented using any suitable switch, server, terminal, computer, or application. Communication system 400 includes one or more of each of: processor 1220, memory 1230, and network interface 1240. In some embodiments, processor 1220 executes instructions to provide some or all of the functionality described above as being provided by communication system 400, memory 1230 stores the instructions executed by processor 1220, and network interface 1240 communicates signals to radio access nodes 120, other network nodes 130, or backend networks.

Processor 1220 may comprise any suitable combination of hardware and software implemented in one or more modules to execute instructions and manipulate data to perform some or all of the described functions of communication system 400. In some embodiments, processor 120 may include, for example, one or more computers, one or more central processing units (CPUs), one or more microprocessors, one or more applications, and/or other logic.

Memory 1230 is generally operable to store instructions, such as a computer program, software, an application comprising one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processor 1220 and may refer to any suitable device operable to receive input for the communication system 400, send output from the communication system 400, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Alternative embodiments of the communication system 400 may include additional components beyond those shown in FIG. 12A that may be responsible for providing certain aspects of the functionality, including any of the functionality described herein and/or any additional functionality (including any functionality necessary to support the solution described herein). The various different types of communication systems 400 may include components having the same physical hardware but configured (e.g., via programming) to support different functionality, or may represent partly or entirely different physical components.

FIG. 12B illustrates a general processor unit 1250 that can be implemented using one or more processors 1220 of FIG. 12A. General processor unit 1250 includes input module 1260, processor module 1270, and output module 1280. Input module 1260 can receive a trigger to set up a bearer path connecting a first party (A) and a second party (B) via a media connection function 420. Input module 1260 communicates the trigger to processor module 1270. In response, processor module determines a predicted time gap between when the media connection function 420 is expected to receive a bearer packet from the first party (A) and when the media connection function 420 is expected to receive a bearer packet from the second party (B). Processor module 1270 then initiates setting up the connections toward party (A) and party (B).

If the media connection function 420 is expected to receive the bearer packet from the first party (A) prior to receiving the bearer packet from the second party (B), processor module 1270 delays (or instructs output module 1280 to delay) the connection setup towards the first party (A) based on the predicted time gap. If the media connection function 420 is expected to receive the bearer packet from the second party (B) prior to receiving the bearer packet from the first party (A), processor module 1270 delays (or instructs output module 1280 to delay) the connection setup towards the second party (B) based on the predicted time gap.

In certain embodiments, processor module 1270 determines the predicted time gap from historical data. Processor module 1270 may continually update the historical data. For example, for each call/session for which communication system 400 sets up independent bearers (e.g., each SRVCC call/session), processor module 1270 may determine (1004) timing of a first applicable media packet A (e.g., voice packet for an SRVCC call/session) from the first party (A), determine (1006) timing of a first applicable media packet B (e.g. voice packet for an SRVCC call/session) from the second party (B), determine (1008) a time gap (e.g., voice gap) between packet A and packet B, and update (1010) historical data based on the time gap and other relevant data such as delay timer value used.

As should be understood from the foregoing, certain embodiments of the disclosure contemplate a mechanism that detects the media gap using messaging between the MSC server and the MGW controlled by the MSC server for SRVCC calls/sessions and emergency SRVCC calls/sessions. Certain embodiments save the media gap experienced in a call/session and delay timer value if applied for different groups of SRVCC calls/sessions identified by different combinations of STN-SR, target LAC, etc. Further grouping can be made for non-emergency SRVCC calls/sessions and emergency SRVCC calls/sessions. Certain embodiments delay sending either PS to CS Response or SIP Invite in the MSC server to reduce the media gap for SRVCC calls/sessions and emergency SRVCC calls/sessions. Certain embodiments provide an adaptive mechanism in calculating the delay timer based on the historical media gap data (which may be grouped, for example, according to non-emergency SRVCC calls/sessions and emergency SRVCC calls/sessions, the location of the first party, the location of the second party, and/or the MGWs in the path).

Particular embodiments of the present disclosure may have one or more advantages. For example, in some embodiments, the delay is performed by the MSC server without involvement of the UE. The MSC server can either delay sending PS to CS response or delay sending SIP Invite to reduce the media gap for SRVCC calls/sessions either in the case where the UE tunes to UTRAN/GERAN access faster than IMS updates the bearer path or in the case where the IMS updates the bearer path faster than the UE tunes to UTRAN/GERAN. An advantage of certain embodiments is that the value of the delay time can be calculated adaptively.

Certain embodiments may have all, some, or none of these advantages. Other advantages may be apparent to one of ordinary skill in the art.

Modifications, additions, or omissions may be made to the above embodiments and other methods disclosed herein without departing from the scope of the invention. The methods may include more, fewer, or other steps. Additionally, steps may be performed in any suitable order. In certain embodiments, the methods disclosed herein may be implemented using a computer program product. The computer program product comprises a non-transitory computer readable storage medium having computer readable program code embodied in the medium, the computer readable program code comprising computer readable program code to perform the steps of the methods.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Although this disclosure has been described in terms of certain embodiments, alterations and permutations of the embodiments will be apparent to those skilled in the art. The embodiments described herein may be combined with each other in any way. Although some embodiments have been described with reference to certain radio access technologies, any suitable radio access technology (RAT) may be used, such as long term evolution (LTE) (FDD or TDD), LTE-Advanced, UTRA, UMTS, HSPA, GSM, cdma2000, WiMax, and WiFi. Moreover, various embodiments may support single-RAT or multi-RAT configurations. Accordingly, the above description of the embodiments does not constrain this disclosure. Other changes, substitutions, and alterations are possible without departing from the spirit and scope of this disclosure.

The invention claimed is:

1. A method in a communication system for reducing a media gap during initial and/or mid call or session setup where bearer paths connecting both involved call parties are established independently after setup procedures are triggered, the method comprising:
   receiving a trigger to set up a bearer path connecting a first party and a second party via a media connection function;
   determining a predicted time gap between when the media connection function is expected to receive a bearer packet from the first party and when the media connection function is expected to receive a bearer packet from the second party;
   if the media connection function is expected to receive the bearer packet from the first party prior to receiving the bearer packet from the second party, delaying connection setup towards the first party based on the predicted time gap; and
   if the media connection function is expected to receive the bearer packet from the second party prior to receiving the bearer packet from the first party, delaying connection setup towards the second party based on the predicted time gap.

2. The method of claim 1, wherein the call or session includes any type of call or session that is controlled by any type of communication system that anchors a bearer with media connection function(s), and the bearer paths connecting both involved call parties are established independently after their respective setup procedures are triggered.

3. The method of claim 1, wherein the predicted time gap is determined based on historical data for a pre-determined number of similar previous calls or sessions,
wherein:
if a handover request message is for an emergency call or session, each of a pre-determined number N of previous handovers is associated with a previous emergency call or session; and
if a handover request message is for a non-emergency call or session, each of a pre-determined number N of previous handovers is associated with a previous non-emergency call or session.

4. The method of claim 1, wherein a control function of the communication system determines the predicted time gap based at least in part on historical data previously received from the media connection function and previous delay timer values used for a similar call or session type.

5. The method of claim 4, wherein the historical data includes one or more of:
information that indicates when the media connection function detected a first relevant bearer packet in a call or session from the first party;
information that indicates when the media connection function detected a first relevant bearer packet in a call or session from the second party; and/or
information indicating a difference between when the media connection function detected the first relevant bearer packet in the call or session from the first party and when the media connection function detected the first relevant bearer packet in the call or session from the second party.

6. The method of claim 1, further comprising:
determining a real media gap experienced in a call or session between when the media connection function received the bearer packet from the first party and when the media connection function received the bearer packet from the second party; and
recording an actual media gap as part of historical data that is used to predict a media gap for similar subsequent calls or sessions, wherein the actual media gap is a gap that would have been experienced if the call or session had not been delayed.

7. The method of claim 1, wherein the delaying the connection setup towards the first party comprises:
starting a timer before, during, or in response to initiating connection setup toward the second party, the timer set according to the predicted time gap;
determining that the timer has expired; and
initiating connection setup toward the first party in response to expiry of the timer.

8. The method of claim 1, wherein the delaying the connection setup towards the second party comprises:
starting a timer before, during, or in response to initiating connection setup toward the first party, the timer set according to the predicted time gap;
determining that the timer has expired; and
initiating connection setup toward the second party in response to expiry of the timer.

9. The method of claim 1, wherein the predicted time gap is determined based on a statistical analysis of a pre-determined number N of similar previous calls or sessions, wherein the statistical analysis comprises at least one of: determining an average media gap, a maximum media gap, or a minimum media gap for the pre-determined number N of similar previous calls or sessions.

10. The method of claim 1, wherein the trigger to set up the bearer path includes a handover request message requesting to handover a media call or session from a packet switched network to a circuit switched network.

11. The method of claim 10, wherein:
the communication system comprises a mobile switching center (MSC) server that receives the handover request message as a PS to CS Request message from a mobile management entity (MME) or Serving GPRS Support Node (SGSN);
delaying the connection setup towards the first party comprises delaying sending a PS to CS Response message to the MME and/or SGSN associated with the first party; and
delaying the connection setup towards the second party comprises delaying sending a session invitation protocol (SIP) Invite message to an internet protocol multimedia subsystem (IMS) associated with the second party.

12. A method in a communication system working with its media connection function(s) that connects a media bearer path between a first party and a second party during a handover from a packet switched network to a circuit switched network, the method comprising:
determining timing of a first relevant bearer packet A from the first party;
determining timing of a first relevant bearer packet B from the second party;
determining a time gap between the first relevant bearer packet A and the first relevant bearer packet B;
updating historical data based on a real time gap experienced in a handover call or session and any delay timer value applied; and
grouping the historical data based on emergency calls or sessions and non-emergency calls or sessions, wherein for the emergency calls or sessions an emergency session transfer number for SRVCC (E-STN-SR) identifies a location of a node that is a connection entry point for the second party.

13. The method of claim 12, wherein the historical data is grouped based on one or more of:
any criteria that can identify an identity or location of the first party or an identity or location of a node that is a connection entry point for the first party;
any criteria that can identify an identity or location of the second party; and/or
the media connection function(s) that connect the media bearer path.

14. The method of claim 12, wherein a session transfer number for single radio (STN-SR) is a criterion to identify the location of the node that is the connection entry point for the second party.

15. The method of claim 12, further comprising:
determining a predicted time gap corresponding to a bearer packet of the first party and a bearer packet of the second party; and
based on the predicted time gap, delaying a connection setup corresponding to the first party or the second party.

16. A communication system for reducing a media gap during initial and/or mid call or session setup where bearer paths connecting both involved call parties are established independently after setup procedures are triggered, the communication system including:

at least one processor to perform operations comprising:
receive a trigger to set up a bearer path connecting a first party and a second party via a media connection function;
determine a predicted time gap between when the media connection function is expected to receive a bearer packet from the first party and when the media connection function is expected to receive a bearer packet from the second party;
if the media connection function is expected to receive the bearer packet from the first party prior to receiving the bearer packet from the second party, delay connection setup towards the first party based on the predicted time gap; and if the media connection function is expected to receive the bearer packet from the second party prior to receiving the bearer packet from the first party, delay connection setup towards the second party based on the predicted time gap.

17. The communication system of claim 16, wherein the call or session includes any type of call or session that is controlled by any type of communication system that anchors a bearer with media connection function(s), and the bearer paths connecting both involved call parties are established independently after their respective setup procedures are triggered.

18. The communication system of claim 16, wherein the predicted time gap is determined based on historical data for a pre-determined number (N) of similar previous calls or sessions, wherein:
if the handover request message is for an emergency call or session, each of a pre-determined number N of previous handovers is associated with a previous emergency call or session; and
if the handover request message is for a non-emergency call or session, each of a pre-determined number N of previous handovers is associated with a previous non-emergency call or session.

19. The communication system of claim 16, wherein a control function of the communication system determines the predicted time gap based at least in part on historical data previously received from the media connection function and previous delay timer values used for a similar call or session type.

20. The communication system of claim 16, wherein the trigger to set up the bearer path includes a handover request message requesting to handover a media call or session from a packet switched network to a circuit switched network.

21. The communication system of claim 20, wherein:
the communication system comprises a mobile switching center (MSC) server that receives the handover request message as a PS to CS Request message from a mobile management entity (MME) or Serving GPRS Support Node (SGSN);
delaying the connection setup towards the first party comprises delaying sending a PS to CS Response message to the MME or SGSN associated with the first party; and
delaying the connection setup towards the second party comprises delaying sending a session invitation protocol (SIP) Invite message to an internet protocol multimedia subsystem (IMS) associated with the second party.

* * * * *